(12) United States Patent
Lehn et al.

(10) Patent No.: US 12,385,471 B2
(45) Date of Patent: Aug. 12, 2025

(54) PORTABLE AND RETRACTABLE OFF-GRID TURBINE SYSTEM

(71) Applicant: BDE Inventions, LLC, Dyersville, IA (US)

(72) Inventors: Ian Lehn, Bonita Springs, FL (US); Wesley Conway Poole, Dyersville, IA (US); Devon Clark Register, Wellington, MO (US)

(73) Assignee: BDE INVENTIONS, LLC, Dyersville, IA (US)

( * ) Notice: Subject to any disclaimer, the term of this patent is extended or adjusted under 35 U.S.C. 154(b) by 0 days.

(21) Appl. No.: 18/740,148

(22) Filed: Jun. 11, 2024

(65) Prior Publication Data

US 2024/0410336 A1 Dec. 12, 2024

Related U.S. Application Data

(60) Provisional application No. 63/472,527, filed on Jun. 12, 2023.

(51) Int. Cl.
*F03D 13/20* (2016.01)
*F03D 3/06* (2006.01)

(52) U.S. Cl.
CPC .......... *F03D 13/2005* (2023.08); *F03D 3/063* (2023.08); *F05B 2240/9151* (2013.01); *F05B 2240/941* (2013.01)

(58) Field of Classification Search
CPC ................. F03D 13/2005; F03D 3/063; F05B 2240/9151
See application file for complete search history.

(56) References Cited

U.S. PATENT DOCUMENTS

| | | | | |
|---|---|---|---|---|
| 7,339,286 B1* | 3/2008 | Chen | .......................... | F03D 9/00 290/55 |
| 8,299,645 B2* | 10/2012 | Muchow | ................... | F03D 13/10 290/55 |
| 8,915,697 B2* | 12/2014 | Pitre | ........................ | F03D 13/20 415/908 |
| 11,448,189 B2* | 9/2022 | Dietzel | ...................... | F03D 9/32 |
| 11,592,004 B2* | 2/2023 | Karasawa | .............. | F03B 17/061 |
| 12,078,146 B2* | 9/2024 | de Souza | ................. | F03D 13/10 |
| 12,180,927 B2* | 12/2024 | Karasawa | ............ | F03D 13/2005 |
| 2009/0079161 A1* | 3/2009 | Muchow | .................... | F03D 9/32 320/101 |
| 2010/0140949 A1* | 6/2010 | Pitre | ........................ | F03D 13/20 290/55 |

(Continued)

FOREIGN PATENT DOCUMENTS

GB 2427003 A * 12/2006 ................ F03D 3/06

OTHER PUBLICATIONS

International Search Report and Written Opinion of Application No. PCT/US2024/033452, mailed Aug. 30, 2024, 10 pages.

*Primary Examiner* — Eldon T Brockman

(57) ABSTRACT

An apparatus for deployment of a wind turbine includes a wind turbine coupled to a first end of an extendable arm, one or more turbine blades coupled to the wind turbine, wherein the one or more turbine blades are collapsible about the turbine wind turbine, and a housing coupled to a second end of the extendable arm, wherein the wind turbine is extendable from and retractable to the housing via the extendable arm.

16 Claims, 23 Drawing Sheets

(56) References Cited

U.S. PATENT DOCUMENTS

2016/0108893 A1* 4/2016 Agtuca .................... F03D 9/11
                                                   290/44
2018/0030962 A1* 2/2018 Bodanese ............... F03D 13/10
2020/0200147 A1   6/2020 Dietzel
2021/0222676 A1* 7/2021 Karasawa ................ F03D 3/06

* cited by examiner

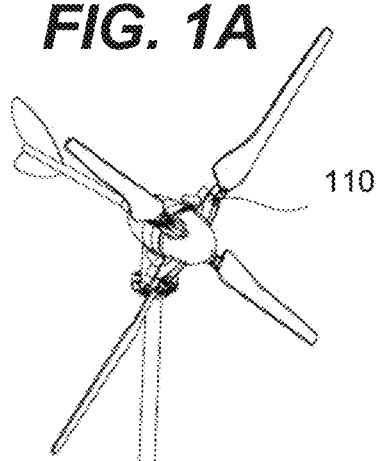
FIG. 1A
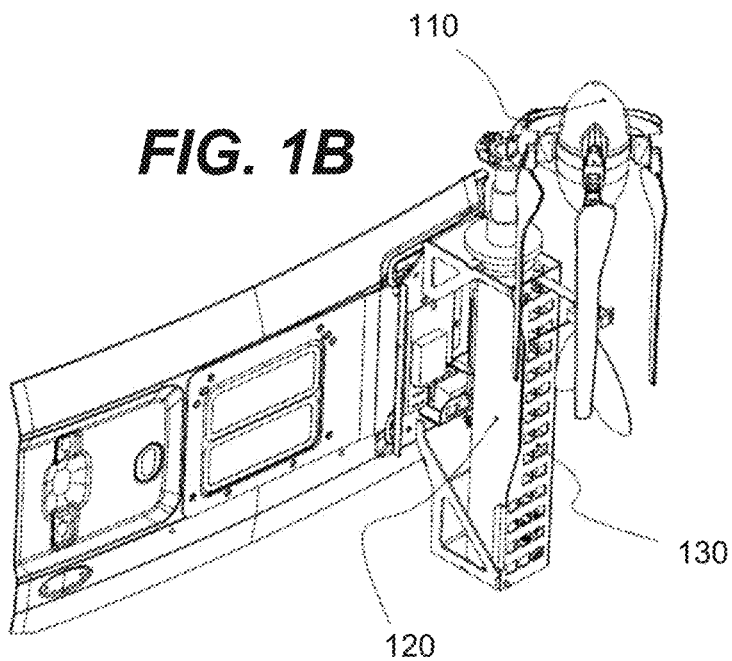
FIG. 1B
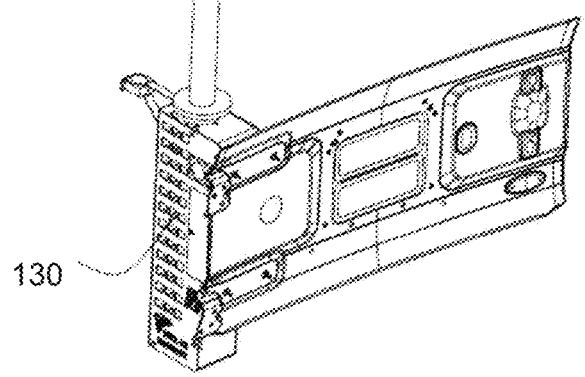

PORTABLE AND RETRACTABLE OFF-GRID TURBINE SYSTEM

RELATED APPLICATIONS

This application claims priority from and the benefit of U.S. Provisional Patent Application No. 63/472,527 filed on Jun. 12, 2023, the entire contents of which are incorporated herein by reference in their entirety.

TECHNICAL FIELD

Aspects and implementations of the present disclosure relate to electricity generation, and more specifically, off-grid electricity generation via a self-contained, portable, deployable, and retractable turbine generator system.

BACKGROUND

An electric generator produces electricity from kinetic motion, such as rotational motion, by producing a rapidly changing magnetic field through a coil of wires or moving a coil of wires through a magnetic field. The kinetic energy may be provided in various forms (e.g., via an internal combustion engine, wind, flowing water, etc.) and may be converted into rotational energy (e.g., via a lever arm applying torque to a driveshaft, gearing, direct drive, etc.). This rotational, kinetic energy may then be converted into an electric current via the above described mechanical, electrical process of alternating magnetic poles through a copper coil (i.e., a permanent magnet generator).

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

FIG. 1A depicts an example of a portable and retractable horizonal axis wind turbine in a deployed position, in accordance with some embodiments of the present disclosure.

FIG. 1B depicts an example of a portable and retractable horizonal axis wind turbine in a retracted position, in accordance with some embodiments of the present disclosure.

DETAILED DESCRIPTION

Figure 2A:
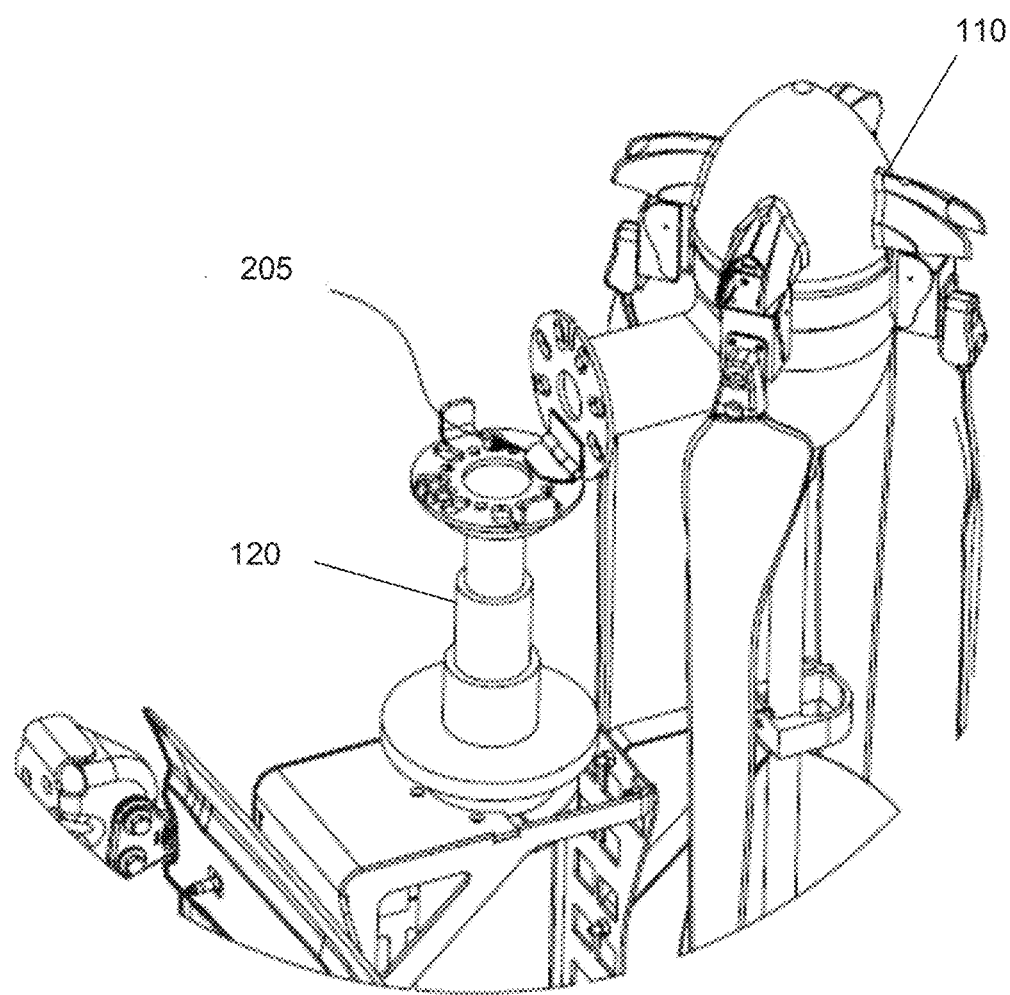
FIG. 2A depicts a perspective view of a turbine, turbine blades, and an extendable arm in a retracted position, in accordance with some embodiments of the present disclosure.

Off-grid power has many applications, ranging from overland and off-roading recreation, camping, sailing, military, construction, and so forth. In nearly all off-grid power applications, the conventional portable electricity generators that are used are both heavy and bulky, limiting the usefulness and practicality of generator use in many situations that could benefit from portable power generation. Such conventional solutions include internal combustion engine generators, batteries, and photovoltaic cells (e.g., solar). However, internal combustion engines require a fuel source which may be limited in remote locations and can be cost prohibitive. Battery power can be useful in remote locations and may be more easily portable than an internal combustion engine generator, however battery power is limited by the capacity of the batteries and thus may not provide power for longer periods of time when external power is unavailable (e.g., overlanding in remote landscapes). Photovoltaic systems (e.g., solar power) can provide power in remote locations but can be costly and cannot provide power without direct sunlight, such as overnight.

Furthermore, conventional wind power generators (e.g., wind turbine systems) may require a mast to be deployed at a minimum height to capture sufficient wind to produce a useful amount of electrical energy. Such masts generally necessitate a static fixed location of a wind turbine system for stability. For similar reasons, portable turbines may be of small stature with limited electrical output. Additionally, wind turbines deployed in remote locations, such as in the dessert or other harsh environments, the electrical and other internal components of the wind turbines may be subject to significant wear and failure from particulates and other debris. For example, the spacing needed to allow the blades of a wind turbine to rotate may allow particulates to enter the wind turbine and damage the internal components.

Embodiments of the present disclosure address the above noted and other deficiencies of conventional portable power production by providing a self-contained, portable, self-deploying, off-grid turbine. In some embodiments, an apparatus for deployment of a wind turbine includes a turbine chassis coupled to a first end of an extendable arm and one or more turbine blades coupled to the turbine blade chassis, the one or more turbine blades being collapsible about the turbine chassis. The apparatus further includes a housing coupled to a second end of the extendable arm, the turbine chassis being extendable from and retractable to the housing via the extendable arm.

In some embodiments, the turbine chassis is configured to articulate with respect to the extendable arm. In some embodiments, the turbine chassis is configured to articulate between a deployed position substantially perpendicular to the extendable arm and a retracted position substantially parallel to the extendable arm. In some embodiments, the one or more turbine blades are configured to collapse about the turbine chassis in the retracted position, wherein when collapsed the turbine blades are disposed parallel to the turbine chassis. In some embodiments, the extendable arm is configured to retract to a shortened position when the turbine is in a retracted state, the retracted state to minimize a volume occupied by the turbine apparatus. In some embodiments, the housing is configured to contain the turbine chassis in a fully retracted position of the turbine apparatus. In some embodiments, the extendable arm is extendable using at least one of a pneumatic pump, a hydraulic pump, a crank system, a pulley system, or a mechanical engine. In some embodiments, the housing is configured to be attachable to a vehicle.

In some embodiments, the apparatus further includes a controller configured to receive an input and transition the turbine apparatus from a retracted state to a deployed state or from the deployed state to the retracted state based on the input. In some embodiments, the turbine is electrically coupled to a battery disposed within the housing, wherein the turbine generates an electric current to charge the battery when in a deployed state. In some embodiments, the battery is external to the housing. For example, leads from the generator may run to an electrical connection that may be internal or external to the housing and to which a battery may be coupled for charging.

In some embodiments, the turbine apparatus may be attached to a vehicle or may be deployed in a standalone manner. Additionally, the turbine apparatus may include a nose cone with holes through the nose cone to provide positive internal pressure to reduce the amount of particulates allowed to enter the turbine chassis.

In some embodiments, a system includes a turbine apparatus including a turbine chassis coupled to a first end of an extendable arm, one or more turbine blades coupled to the turbine blade chassis, wherein the one or more turbine blades are collapsible about the turbine chassis, and a housing coupled to a second end of the extendable arm, wherein the turbine chassis is extendable from and retractable to the housing via the extendable arm. The system further includes a controller configured to receive an input and transition the turbine apparatus from a retracted state to a deployed state or from the deployed state to the retracted state based on the input.

In some embodiments, a method of deploying a turbine includes providing a turbine apparatus in a retracted state, wherein the turbine apparatus includes a turbine chassis coupled to a first end of an extendable arm, one or more turbine blades coupled to the turbine blade chassis, wherein the one or more turbine blades are collapsible about the turbine chassis, and a housing coupled to a second end of the extendable arm, wherein the turbine chassis is extendable from and retractable to the housing via the extendable arm. The method includes converting the turbine apparatus from the retracted state to a deployed state, wherein converting the turbine apparatus includes extending the extendable arm, articulating the turbine chassis from a retracted position to an operating position, and expanding the one or more turbine blades from a collapsed state to an expanded state. The method further includes operating the turbine in the deployed state to generate an electric current. In some embodiments, the operating position of the turbine chassis is substantially perpendicular to the extendable arm and the retracted position of the turbine chassis is substantially parallel to the extendable arm. In some embodiments, the housing is attached to a vehicle.

Accordingly, embodiments described herein enable the user to easily transport the device and erect the turbine in a short period of time (e.g., less than five minutes). The ease of deployment allows the user to maximize uptime for maximum wind capture and power generation. Additionally, the quick collapsibility of the turbine apparatus allows for the system to be returned to a retracted state for safe storage in dangerous scenarios, such as high wind, lightning, etc., and for quick transportability. Furthermore, the turbine system described herein requires no fuel and does not create large amounts of noise like an internal combustion engine, is not limited by battery capacity, and can generate power regardless of sun position or coverage. Therefore, embodiments offer continuous, uninterrupted power generation with low to mid-speed wind conditions.

FIG. 1A depicts an example of a portable and retractable horizonal axis wind turbine apparatus 100 in a deployed position. The apparatus 100 includes a wind turbine 110, a deployment arm 120 and a housing 130. The wind turbine 110 may be a horizontal axis wind turbine (HAWT), as depicted. In other embodiments, the wind turbine may be a vertical axis wind turbine (VAWT), a Darwin type wind turbine, or any other type of wind capture device. The deployment arm 120, also referred to as a mast, may include one or more coaxial sections which may be extended to the deployed position of FIG. 1A by pneumatics, hand crank, electric motor, or any other actuating methodology. In some embodiments, the deployment arm 120 may be extended via a worm gear. The housing 130 may encase electrical components of the apparatus 100 such as a battery, circuitry, a controller (e.g., a microcontroller, processing device, etc.), communication devices, such as Blue-Tooth™, WiFi™, or similar devices, and any other sensitive components of the apparatus 100. As can be seen in FIG. 1A, in the deployed position the deployment arm 120 is fully or partially extended and the wind turbine 110 is in an operational position to capture wind energy via rotation of the turbine blades. For example, in the embodiment utilizing a HAWT, the blades of the wind turbine 110 may be in a fully deployed position to rotate about a horizontal axis and the body of the wind turbine 110 is in a horizontal position, perpendicular to the deployment arm 120. It should be noted that the deployed position of a VAWT may include the full extension of the blades about the vertical axis to capture wind energy and rotate the blades about the vertical axis.

FIG. 1B depicts an example of a portable and retractable horizonal axis wind turbine apparatus 100 in a retracted position. Similar to FIG. 1A, the apparatus 100 includes a wind turbine 110, a deployment arm 120 and a housing 130. In the retracted position of FIG. 1B, the deployment arm 120 may be fully retracted into the housing 130. Additionally, the wind turbine 110 may also be in a retracted position. In some embodiments, as depicted in FIG. 1B, the retracted position of a HAWT may include an articulation of the wind turbine chassis to a vertical position (e.g., parallel to the deployment arm 120). Additionally, the blades of the wind turbine 110 may be articulated or folded along the same axis as the chassis of the wind turbine 110. For example, the blades may be foldable at or near an attachment point of the blades to the chassis or nose cone. Accordingly, the retracted position of the wind turbine 110 is a non-operational position that reduces the volume or area occupied by the apparatus 100. In some embodiments, the housing 130 may be configured to receive and envelope a portion or the entirety of the wind turbine 110. In some embodiments, in which a VAWT wind turbine is used, the blades of the wind turbine 110 may be drawn into or around the chassis of the wind turbine 110, as further depicted and described with respect to FIGS. 4A-C. In some embodiments, the VAWT may be drawn down into the housing 130 in the retracted position.

For example, the wind turbine 110 may be returned to the retracted position of FIG. 1B for transportation or due to severe conditions that may damage the wind turbine 110. The system may also be detached from its mount (e.g., detached from a vehicle) to free up the vehicle or for permanent or semi-permanent deployment. In some examples, the power storage (e.g., battery) and the power generation (e.g., wind turbine 110) is self-contained, but may be connected to a battery bank for larger storage capability FIG. 2A depicts a perspective view of an apparatus 200 including a turbine, turbine blades, and an extendable arm in a retracted position. The apparatus 200 may be the same or similar to the apparatus depicted in FIGS. 1A-B. In some embodiments, the apparatus 200 includes a hinge mount 205 coupling the wind turbine 110 to a deployment arm 120. The hinge mount 205 may provide an articulation of the wind turbine 110 with respect to the deployment arm 120 between a deployed state, where the hinge is closed and fixed, and a retracted state, where the hinge is open to align the wind turbine 110 with the deployment arm 120. In some embodiments, wiring connecting the wind turbine 110 to an electrical circuit including a battery or other electrical storage means may run through the middle of the upper and lower aspects of the hinge mount 205. In some embodiments, the hinge mount 205 is fully automated and can be articulated to and from the retracted/deployed positions via a controller or other signal.

Figure 2B:
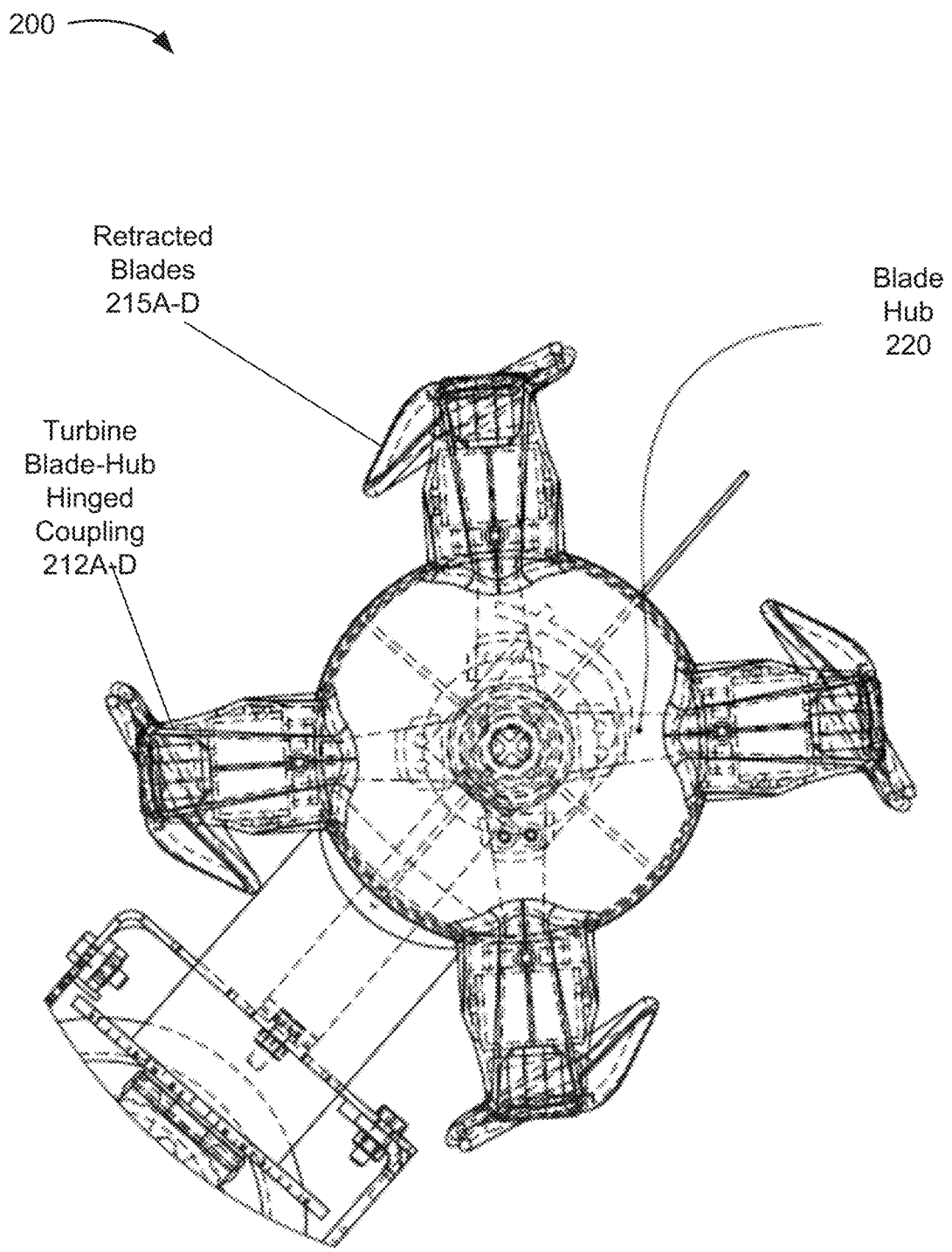
FIG. 2B depicts a top view a turbine and turbine blades in a retracted position, in accordance with some embodiments of the present disclosure.

FIG. 2B depicts a top view an apparatus 200 including a turbine and turbine blades in a retracted position. The wind turbine 110 is actuated to the retracted position via a hinge mount 205, as described with respect to FIG. 2A. Additionally, the turbine blades 215A-B, are folded or articulated to be parallel to the chassis of the wind turbine. As can be seen in FIG. 2B, the turbine blades 215A-D may each include a hinge coupling 212A-D to allow articulate from a perpendicular deployed position to a parallel retracted position. In some embodiments, the turbine blades may be fully or partially detachable from the turbine chassis to further reduce the area of the retracted apparatus 200. In some embodiments, the housing may further include storage for the removable turbine blades. In some embodiments, the hinges 212A-D are fully automated and can be articulated to and from the retracted/deployed positions via a controller or other signal. In some embodiments, the blades 215A-D are coupled to a blade hub 220 which may be coupled to the rotor of the wind turbine.

Figure 2C:
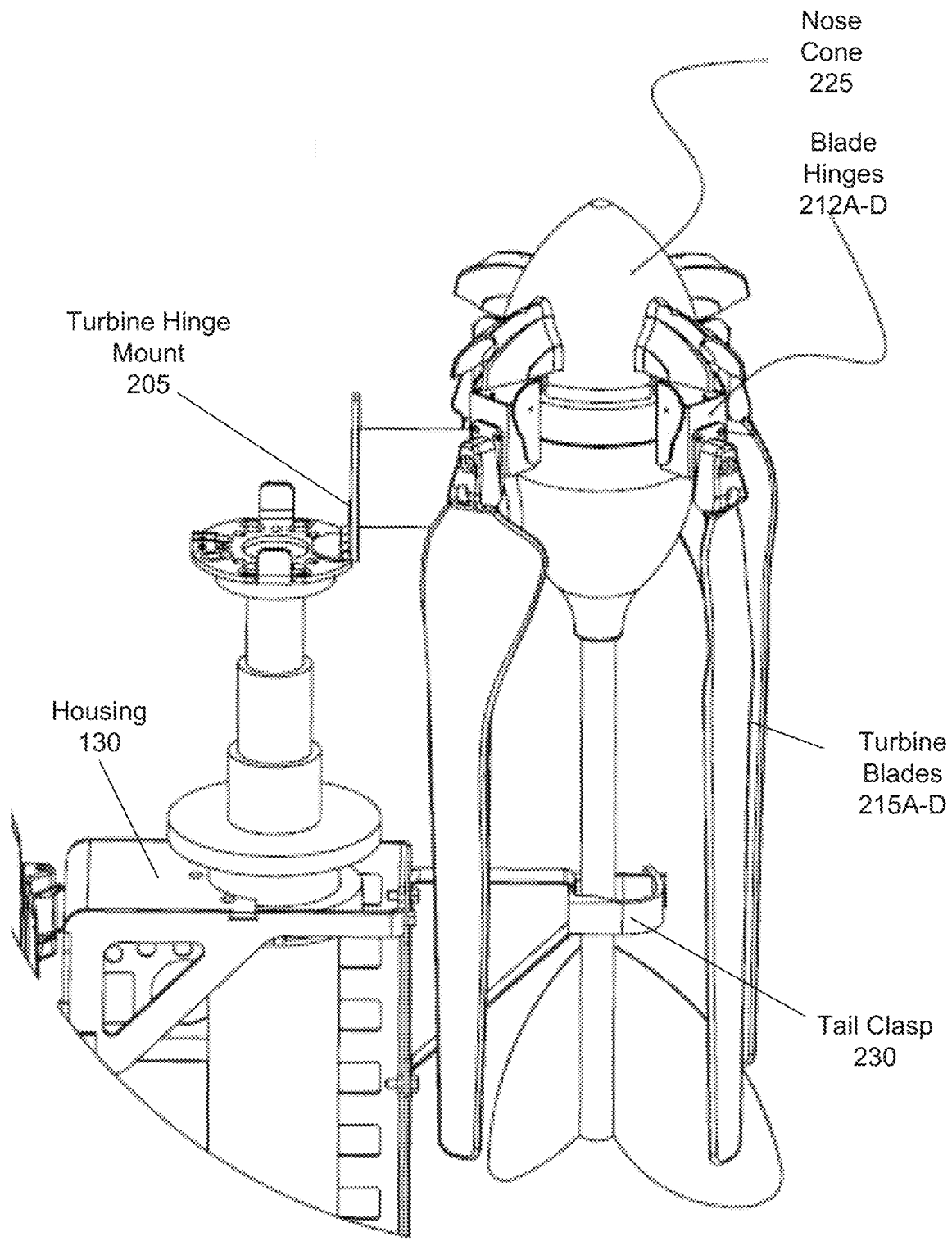
FIG. 2C depicts a side view of a wind turbine apparatus in a retracted position, according to some embodiments of the present disclosure.

FIG. 2C depicts a side view of an apparatus 200 in a retracted position, according to some embodiments. As previously described with respect to FIGS. 2A and 2B, a turbine hinge mount 205 may articulate the turbine chassis to be parallel with the deployment arm 120. Additionally, in the retracted position a tail of the wind turbine may be attached or secured to the housing 130 via a tail clasp 230. The tail clasp 230 may further secure the wind turbine when in the retracted position for transportation, severe conditions, etc.

Figure 3A:
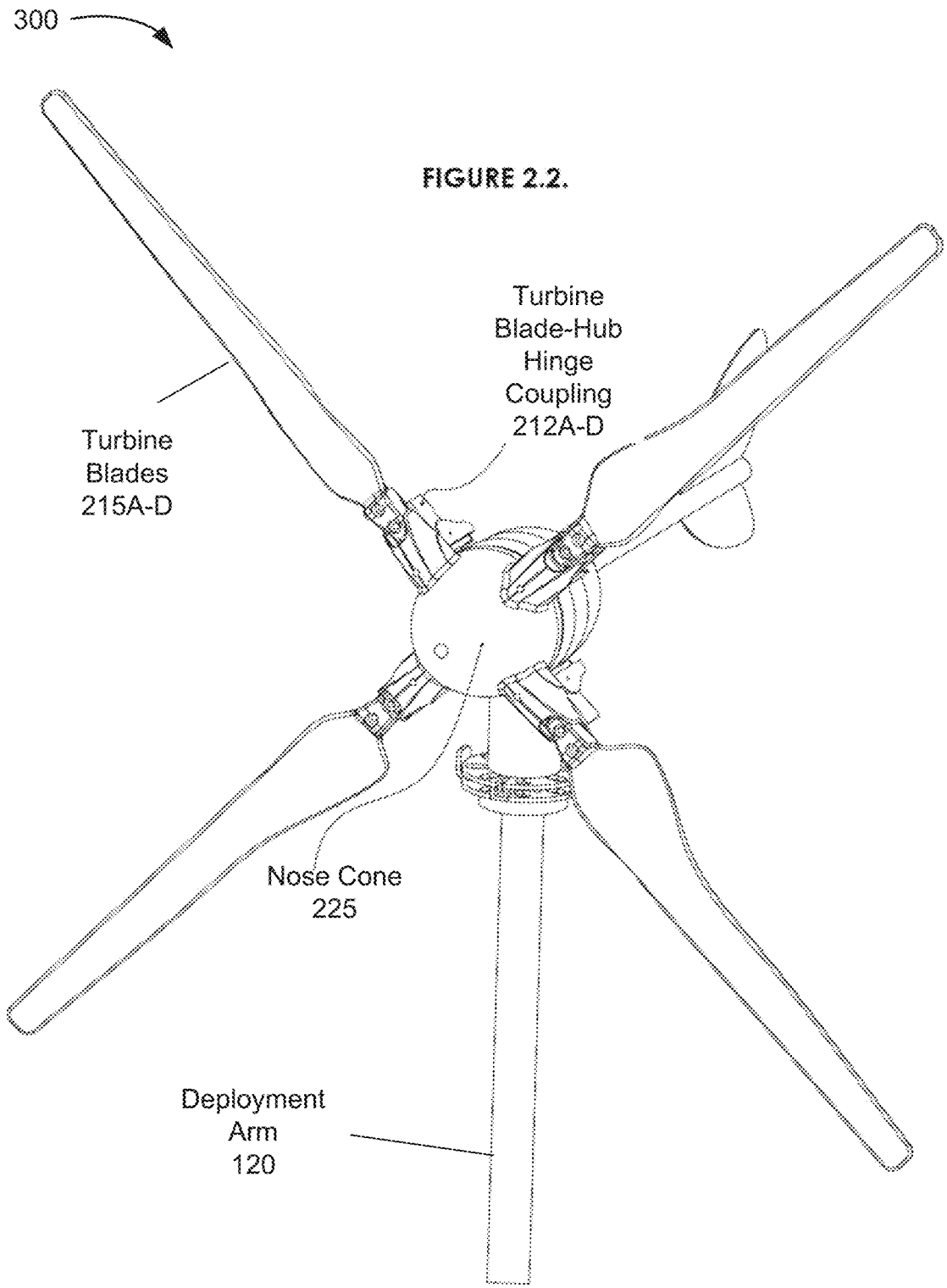
FIG. 3A depicts a portable and retractable horizontal axis wind turbine in a deployed and operating state, in accordance with some embodiments of the present disclosure.

FIG. 3A depicts a portable and retractable horizontal axis wind turbine apparatus 300 in a deployed and operating state. The apparatus 300 may be the same or similar to the apparatus depicted in FIGS. 1A-B and 2A-B. As depicted, the wind turbine 110 may be fixed in a deployed position via the hinge mount 205 when in the deployed state. Additionally, the turbine blades 215A-D may be articulated and fixed in the deployed position via hinges 212A-D when the apparatus 300 is in the deployed state.

Figure 3B:
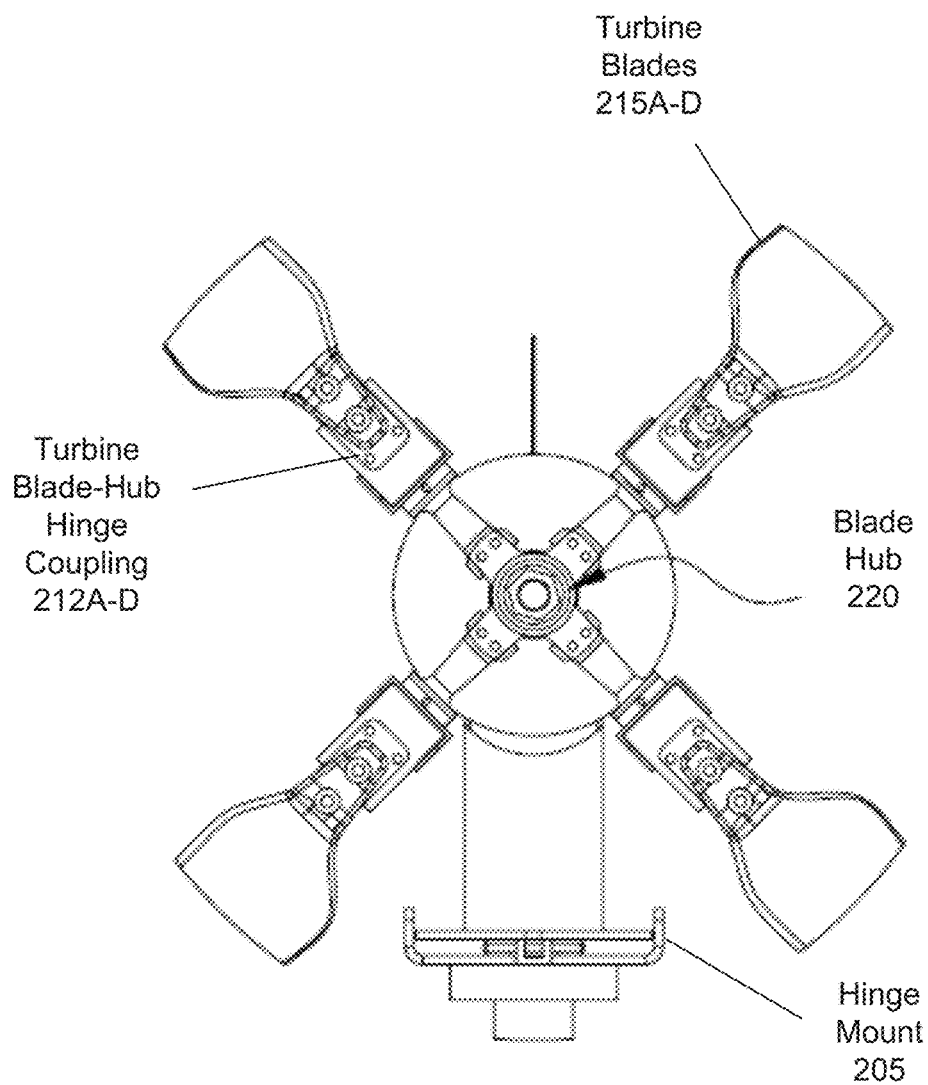
FIG. 3B depicts a close-up view of a portable and retractable horizontal axis wind turbine body and hub, in accordance with some embodiments of the present disclosure.

FIG. 3B depicts a close up view of a portable and retractable horizontal axis wind turbine apparatus 300 in a deployed and operating state. As described above with respect to FIG. 3A, the wind turbine apparatus 300 may include a blade hub 220 and turbine blade-hub hinged couplings 212A-D attached to each arm of the blade hub 220. The hinged couplings 212A-D may each include a hinge and a securing mechanism such as a latch, pin, screw, or other mechanism to secure the turbine blades 215A-D in either a deployed position (e.g., as depicted in FIG. 3B) or in a retracted position. The hinged couplings 212A-D may further include bracing features, such as sidewalls in which the turbine blades 215A-D may sit when in the deployed position to compensate for the torque applied to the turbine blades 215A-D during operation of the wind turbine. Additionally, as can be seen in FIG. 3B, in the deployed state the hinge mount 205 is closed and secured to position the wind turbine to capture wind energy view the turbine blades 215A-D.

In some embodiments, the wind turbine apparatus 300 may deploy a braking mechanism to control rotation speed of the blades of 215A-D of the wind turbine apparatus 300. For example, the braking mechanism may be a mechanical braking system. In other examples, the braking mechanism may be an electrical braking method in which the generator of the wind turbine is temporarily converted to a motor (e.g., such as a dynamotor). In another example, the braking mechanism may include a separate electric motor to apply torque to the turbine as necessary (e.g., for braking or speed regulation).

Figures 4A, 4B:
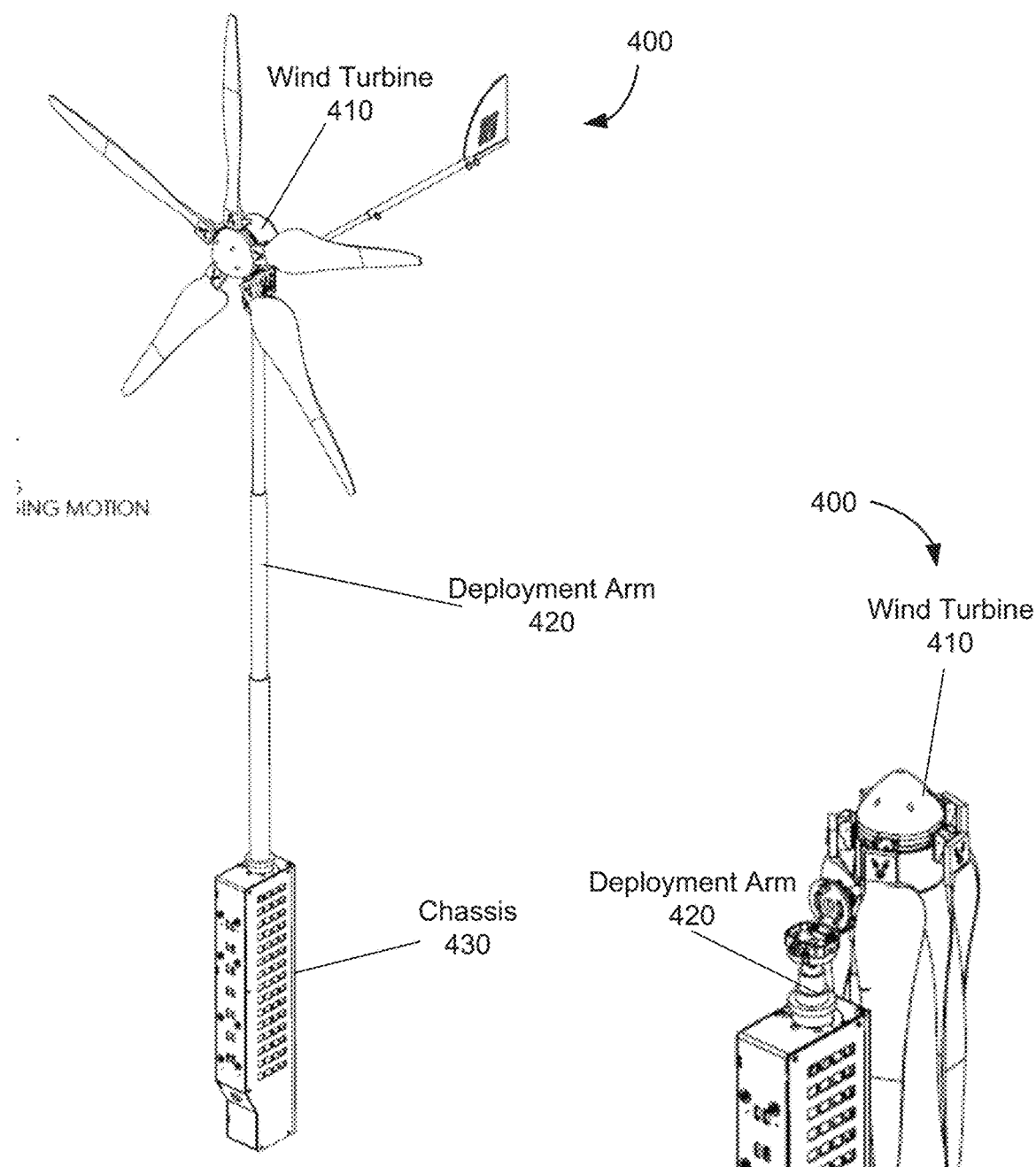
FIG. 4A depicts another example of a portable and retractable horizonal axis wind turbine in a deployed position, in accordance with some embodiments of the present disclosure.
FIG. 4B depicts another example of a portable and retractable horizonal axis wind turbine in a retracted position, in accordance with some embodiments of the present disclosure.

FIG. 4A illustrates another example embodiment of a portable and retractable wind turbine apparatus 400, according to some embodiments. Similar to the embodiments described with respect to FIGS. 1A and 1B, the wind turbine apparatus 400 includes a wind turbine 410, such as a HAWT, including multiple blades to capture wind energy and transfer the energy into rotational energy within the generator to produce an electric current. The wind turbine 410 may be coupled to a deployment arm 420. The deployment arm 420 may include multiple telescoping sections such that the deployment art can be extended into a deployed state, as depicted in FIG. 4A or a retracted state, as depicted in FIG. 4B. Additionally, as described in further detail with respect to FIG. 5, the wind turbine 410 may articulate with respect to the deployment arm into a minimized, retracted position in which the blades and tail fin of the wind turbine are aligned and positioned along the chassis 430 of the apparatus 400. For example, the deployment arm 420 may retract into the chassis 430 and the wind turbine 410 may be collapsed and folded along the chassis 430 to provide a minimal footprint when in the retracted position of FIG. 4B.

Figure 5:
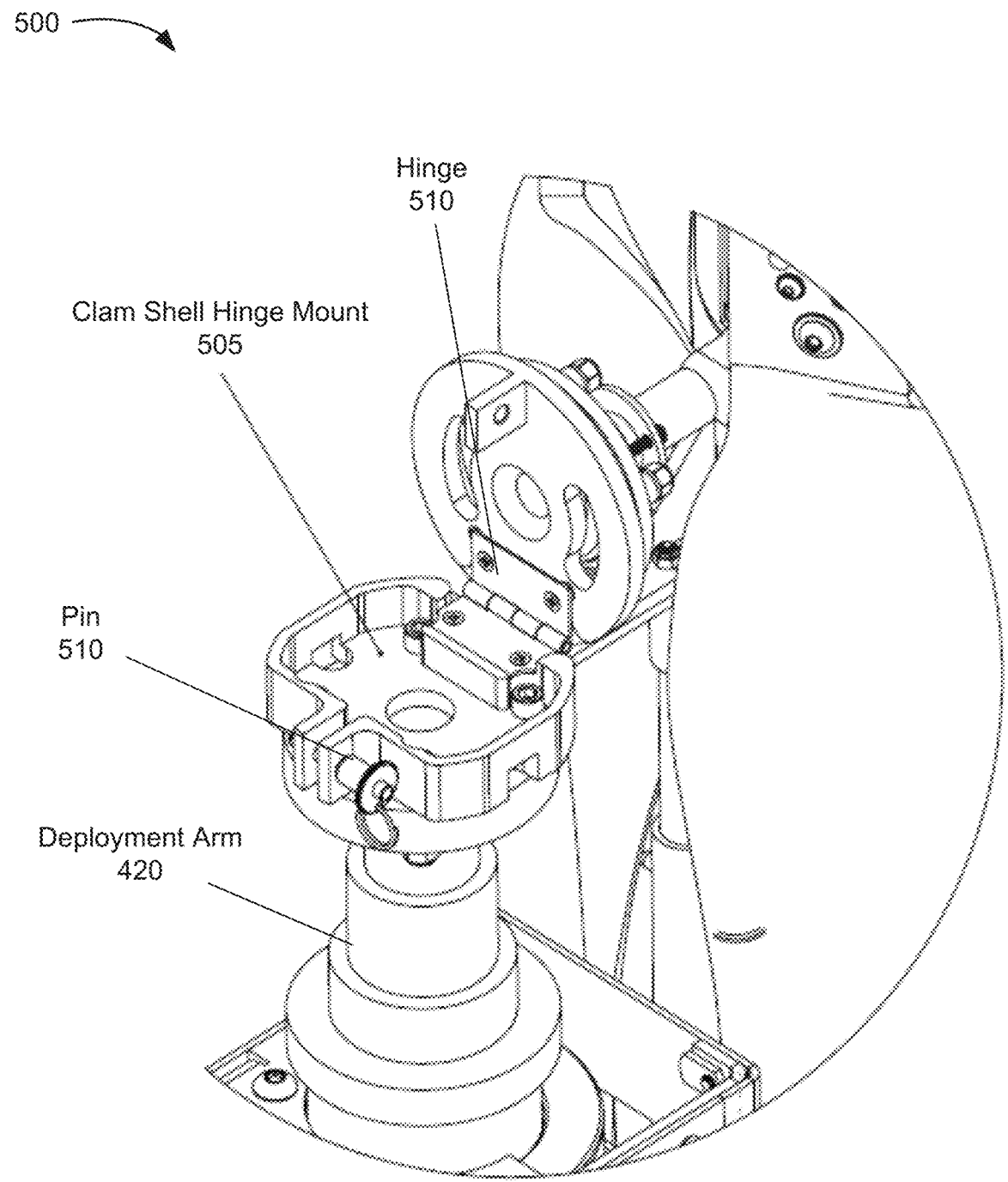
FIG. 5 depicts an example hinged mount coupling a wind turbine to an extendable deployment arm, in accordance with some embodiment of the present disclosure.

FIG. 5 illustrates a hinged mounting assembly 500 for coupling a wind turbine to a deployment arm (e.g., such as wind turbine 410 to deployment arm 420 of FIGS. 4A and 4B). As depicted, the hinged mounting assembly 500 may include a clam shell hinge mount 505 which includes an internal open space when in the closed position. The clam shell hinge mount 5050 may include a hinge 500 allowing articulation of the wind turbine (e.g., attached to the upper portion of the clam shell hinge mount 505) with respect to the deployment arm 420 about the hinge 510. Accordingly, the wind turbine can be arranged in a deployed position by closing the clam shell hinge mount 505 and providing a pin 510 for securing the upper portion of the clam shell hinge mount 505 to the lower portion. Similarly, the wind turbine can be moved to the retracted state (e.g., as depicted in FIG. 5) by removing the pint 510 and articulating the wind turbine about the hinge 510 to the retracted state. In some embodiments, the pin 510 may be a quick release pin with a spring mechanism to cause the resting state of the pin 510 to be extended through the pin hole. It should be noted that any other securing mechanism may also be used to secure the upper portion of the clam shell hinge mount 505 to the lower portion.

Figure 6A:
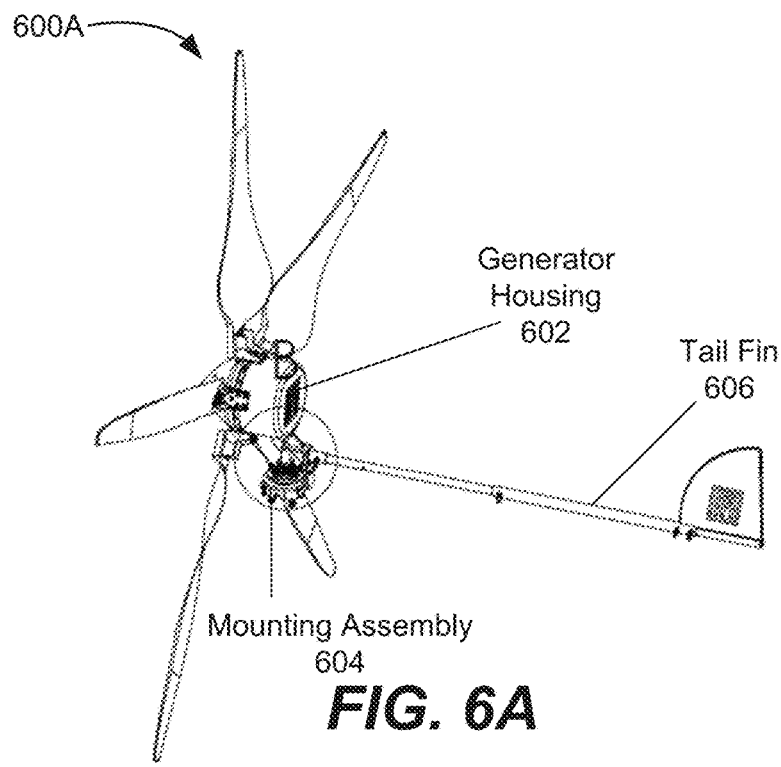
FIG. 6A depicts an example of a collapsible wind turbine apparatus in accordance with some embodiments of the present disclosure.

FIG. 6A illustrates a wind turbine 600A according to some embodiments of the present disclosure. The wind turbine 600A includes a turbine including a generator housing 602, a mounting assembly 604 and a tail fin 606. The generator housing 602 may contain an electric generator and wiring to produce and carry an electric current. The mounting assembly 604 may include mounting components to couple the wind turbine 600A to a deployment arm. The tail fin 606 may include one or more components to allow collapse and extension or removal of the tail fin 606 from the wind turbine 600A.

Figure 6B:
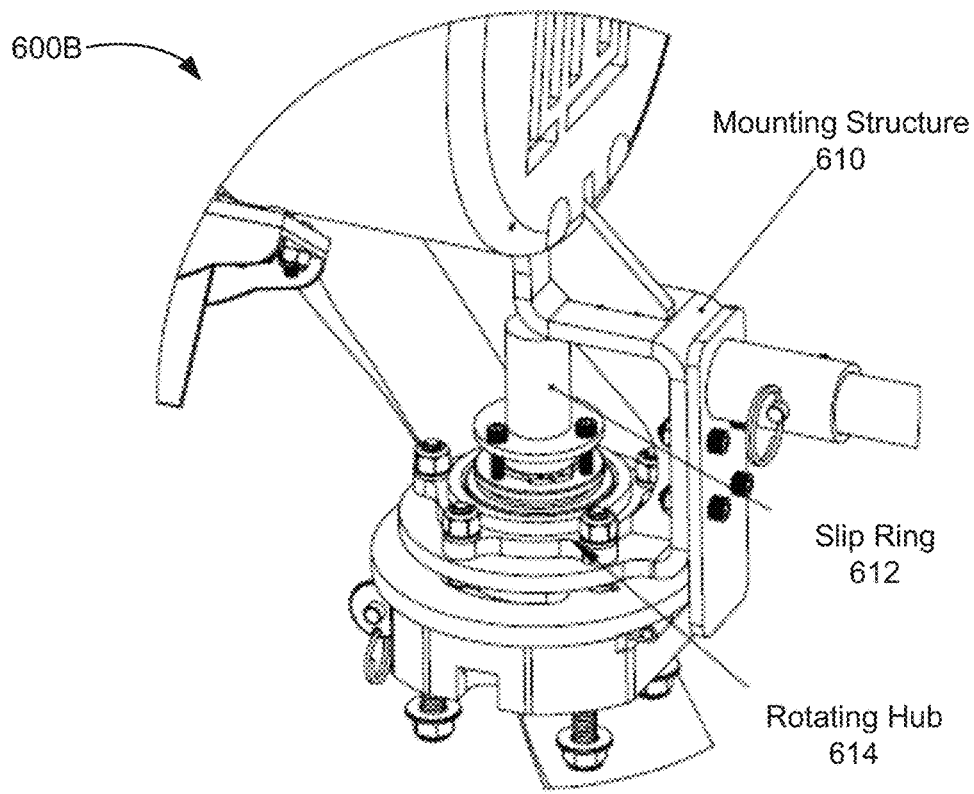
FIG. 6B depicts a rotating mounting structure for a wind turbine apparatus in accordance with some embodiments of the present disclosure.

FIG. 6B illustrates a wind turbine mounting assembly 600B (e.g., mounting assembly 604 of FIG. 6A) according to some embodiments. The mounting assembly 600B may include a mounting structure 610 including a rigid structure to support the weight of the wind turbine. The mounting structure 610 may be coupled to a hinge mount (e.g., hinge mount 505 of FIG. 5). In some embodiments, the mounting structure 610 may be coupled to the hinge mount 505 via a rotating hub 614. For example, the rotating hub 614 may include a central fixed portion about which an external portion can rotate about the central fixed portion. In some embodiments, a bearing may be disposed between the central fixed portion and the external portion of the rotating hub 614 to allow the external portion to rotate through 360 degrees about the central fixed portion. Accordingly, the mounting structure 610 may be coupled to the external portion of the rotating hub 614. Thus, the wind turbine may be rotatable through a 360-degree range via the coupling of the mounting structure to the rotating hub 614. In some embodiments, the turbine mounting assembly 600B may further include a slip ring 612 to provide an electrical connection to and from the wiring of the wind turbine without bending wires. Therefore, the wind turbine can rotate freely without stress or damage to the wiring of the wind turbine apparatus.

Figure 6C:
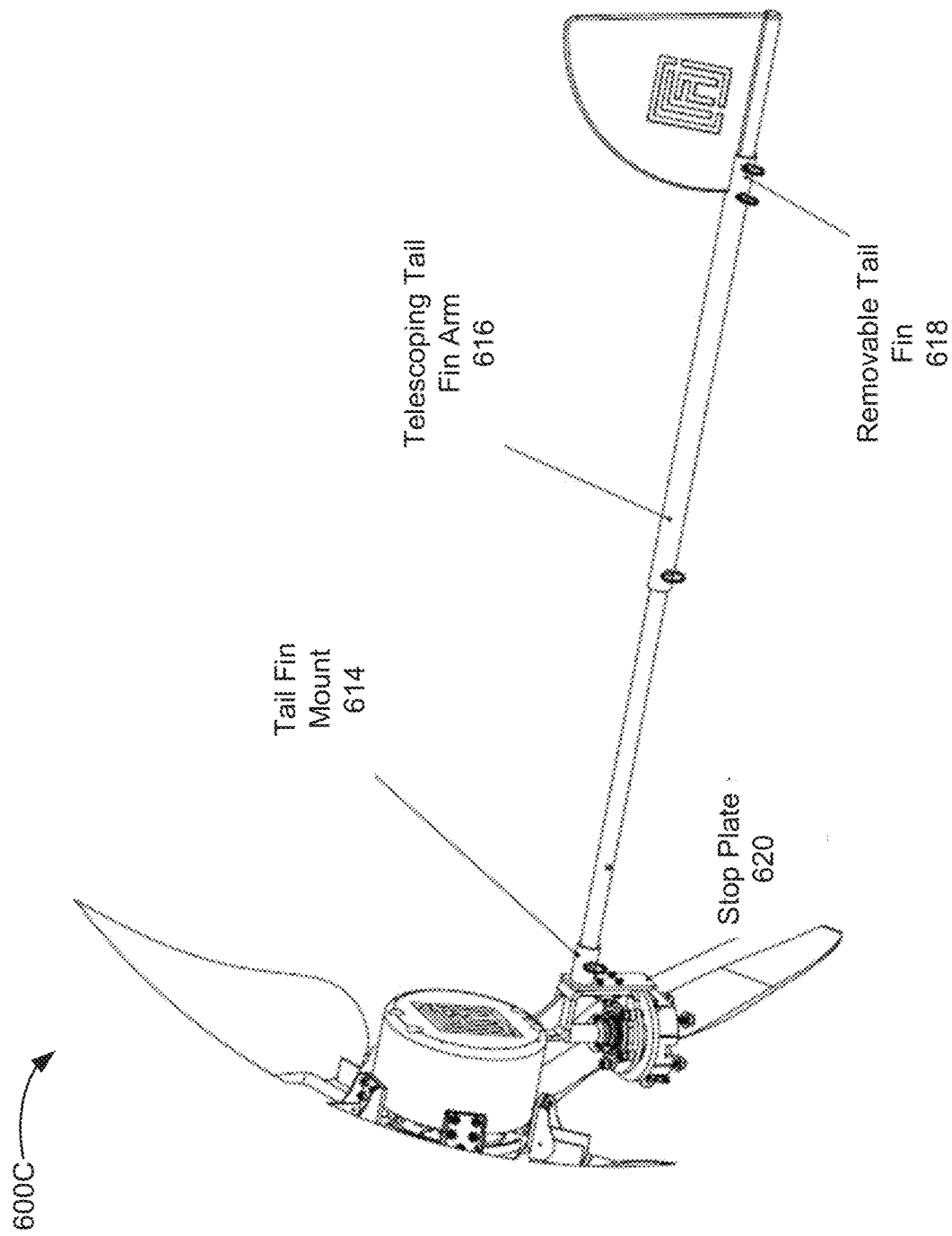
FIG. 6C depicts another view of the example collapsible wind turbine apparatus, in accordance with some embodiments of the present disclosure.

FIG. 6C illustrates a wind turbine tail fin assembly 600C according to some embodiments. In some embodiments, the tail fin assembly 600C may include a tail fin mount 614 where the tail fin is coupled to the mounting assembly of the wind turbine (e.g., at the mounting structure 610) and a telescoping tail fin arm 616 coupled to the tail fin mount 614. A tail fin 618 may further be attached to one end of the telescoping tail fin arm 616 opposite the tail fin mount 614. The tail fin assembly 600C may also include a stop plate 620 to provide a stopping point for the telescoping tail fin arm 616. In some embodiments, the telescoping tail fin arm 616 may be detachable from the tail fin mount 614 (e.g., via a pin, screw, etc.). In some embodiments, the tail fin 618 may also be removable from the telescoping tail fin arm 616. Accordingly, the tail fin assembly 600C may be reduced to a minimal footprint and also detached from the wind turbine to further reduce the footprint of the wind turbine in the retracted state.

Figure 7B:
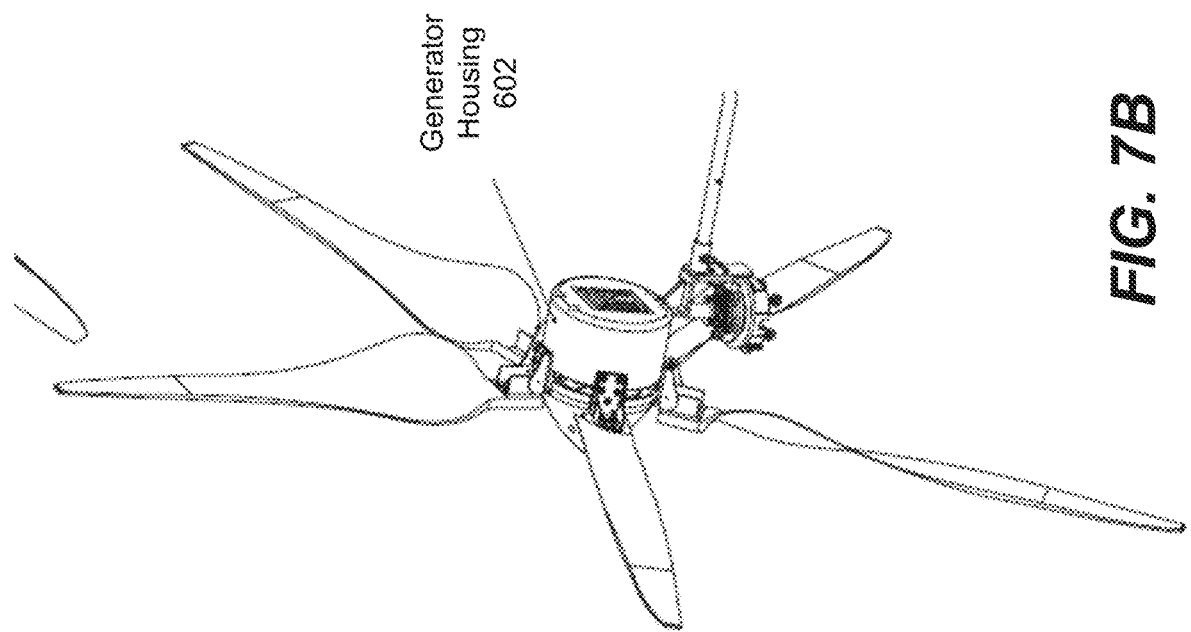
FIG. 7B depicts an example of a turbine housing for internal component protection, according to some embodiments of the present disclosure.
Figure 7A:
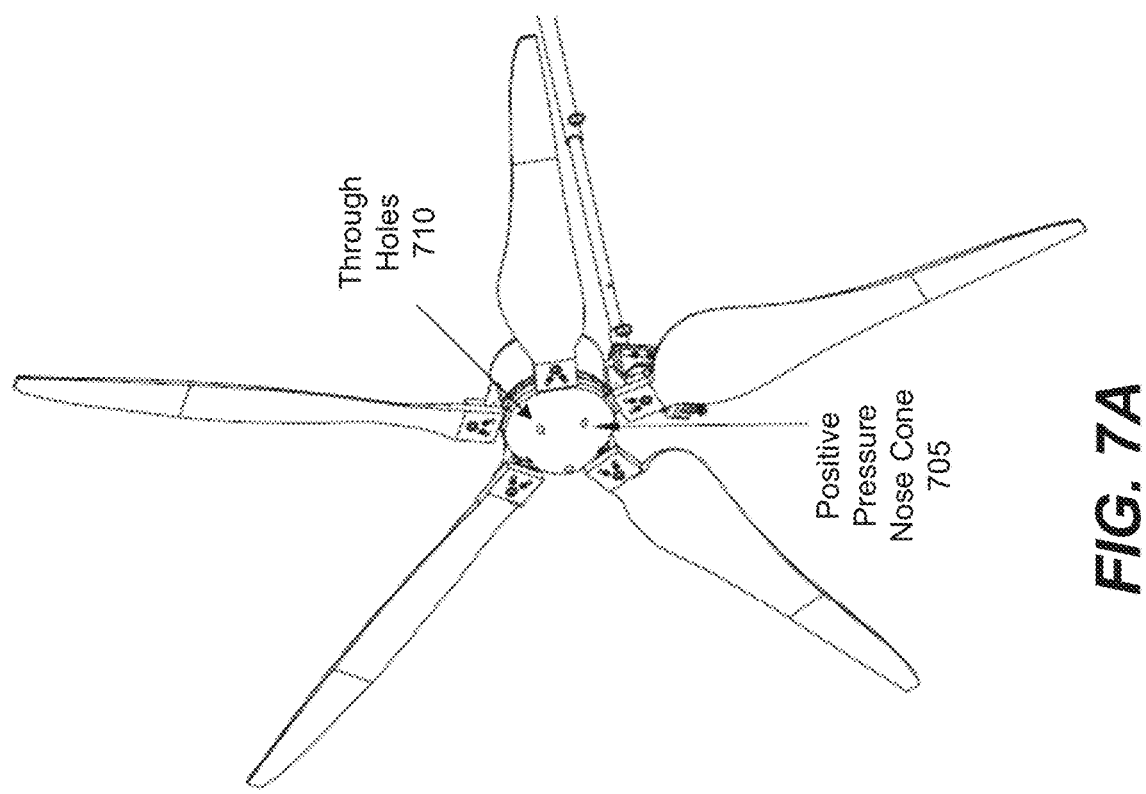
FIG. 7A depicts an example of a nose cone of a wind turbine apparatus with positive pressure design, according to some embodiments.

FIGS. 7A and 7B illustrate a wind turbine 700 including a positive pressure nose cone 705 according to some embodiments of the present disclosure. As depicted in FIG. 7A, the positive pressure nose cone 705 may include a plurality of through holes 710 to generate a positive internal pressure of the generator housing 602 which works to prevent or reduce particulates or debris from entering the generator housing and damaging the internal components of the wind turbine. For example, the through holes 710 may each include a filter to allow air to flow through them but to filter particulates. Thus, positive pressure or air flow can be created within the generator housing to push particulates out and away from the internal components of the generator housing 602. Accordingly, the positive pressure nose cone 705 may increase longevity of the wind turbine and reduce maintenance requirements of the components of the wind turbine. Additionally, the positive pressure nose cone 705 may allow the wind turbine to be deployed in harsh environments in which a traditional wind turbine would otherwise have a limited lifetime and thus limited practical application. In some embodiments, the nose cone may also, or alternatively, extend along the generator housing to further reduce the entry of particulates into the generator housing 602, as depicted in FIGS. 7C and 7D.

Figure 7D:
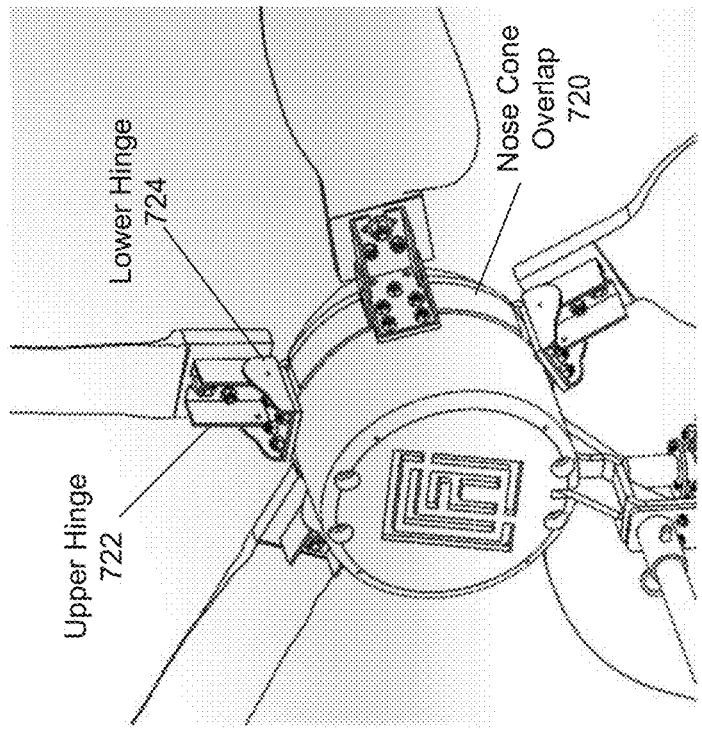
FIG. 7D depicts another example of a turbine nose cone with an overlap over a turbine generator housing, according to some embodiments of the present disclosure.
Figure 7C:
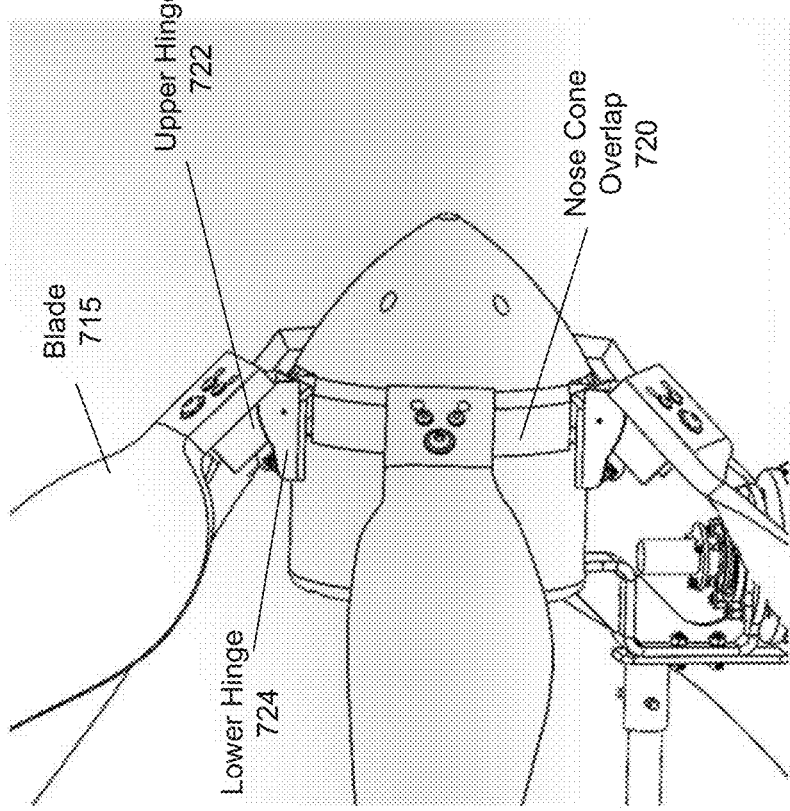
FIG. 7C depicts an example of a turbine nose cone with an overlap over a turbine generator housing, according to some embodiments of the present disclosure.

FIGS. 7C and 7D illustrate an example of a turbine nose cone with an overlap over a turbine generator housing, according to some embodiments of the present disclosure. In some embodiments, the wind turbine 700 may include a nose cone with a nose cone overlap 720 that extends along the generator housing 602 to cover the separation between the nose cone and the housing. The nose cone overlap 720 may extend directly along the external surface of the generator housing 602 with a minimal gap between the nose cone overlap 720 and the generator housing 602 to allow the nose cone to spin. Additionally, the wind turbine 700 may include a hinge coupling for each blade 715 to attach to and fold or articulate with respect to the body of the wind turbine (e.g., the generator housing 602, the nose cone, and blade hub). In some embodiments, the hinge coupling for each blade includes an upper hinger component 722 and a lower hinge component 724. Each blade of the wind turbine 700 may be coupled directly to the upper hinge component 722 while the lower hinge component is coupled to the blade hub (e.g., blade hub 220 of FIGS. 2B and 3B). Accordingly, each of the blades 715 may fold or articulate between a deployed position and a retracted position using the hinged couplings, as described herein.

Figure 8A:
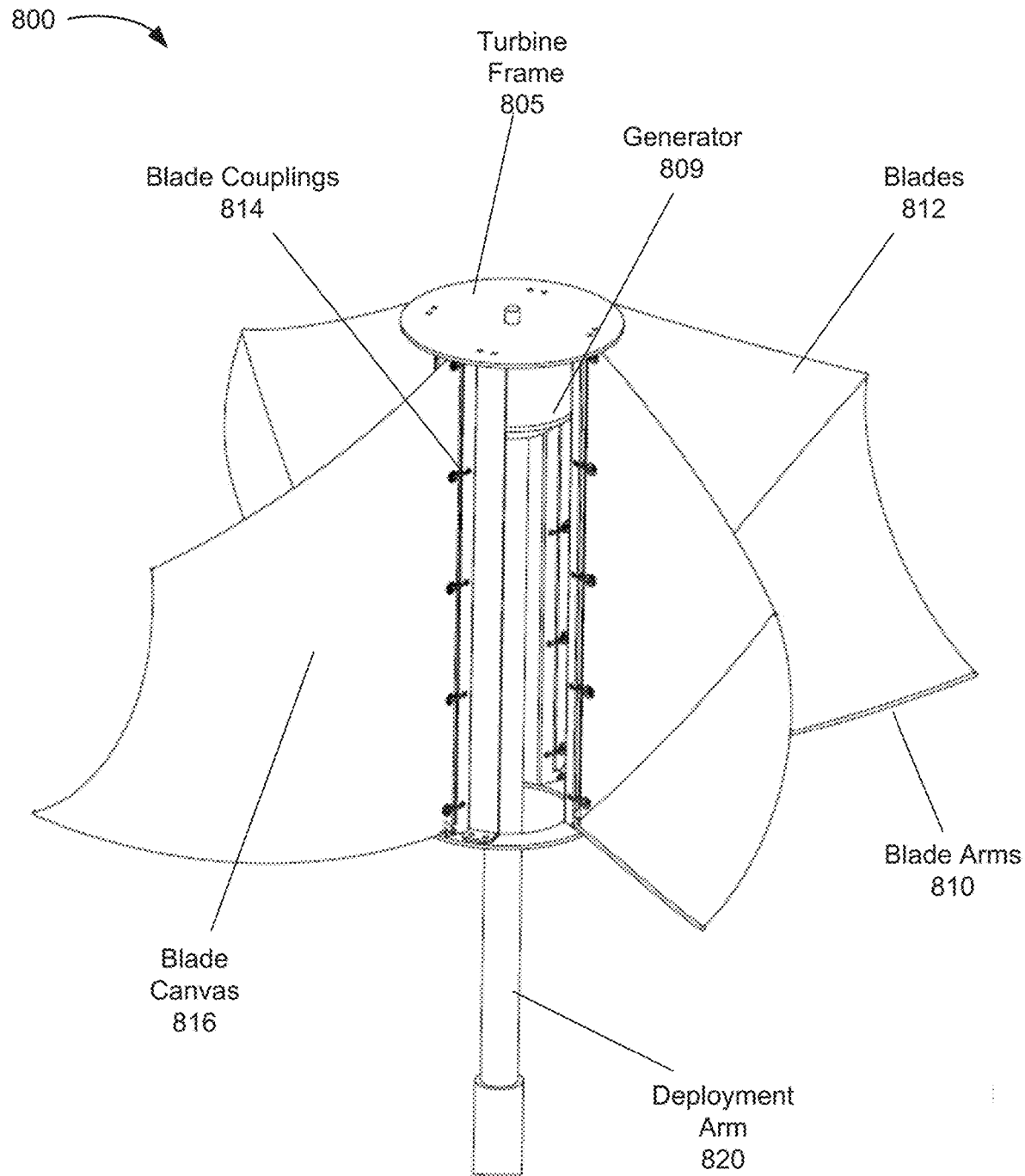
FIG. 8A depicts an example portable and retractable vertical axis wind turbine in a deployed state, in accordance with some embodiments of the present disclosure.
Figure 8B:
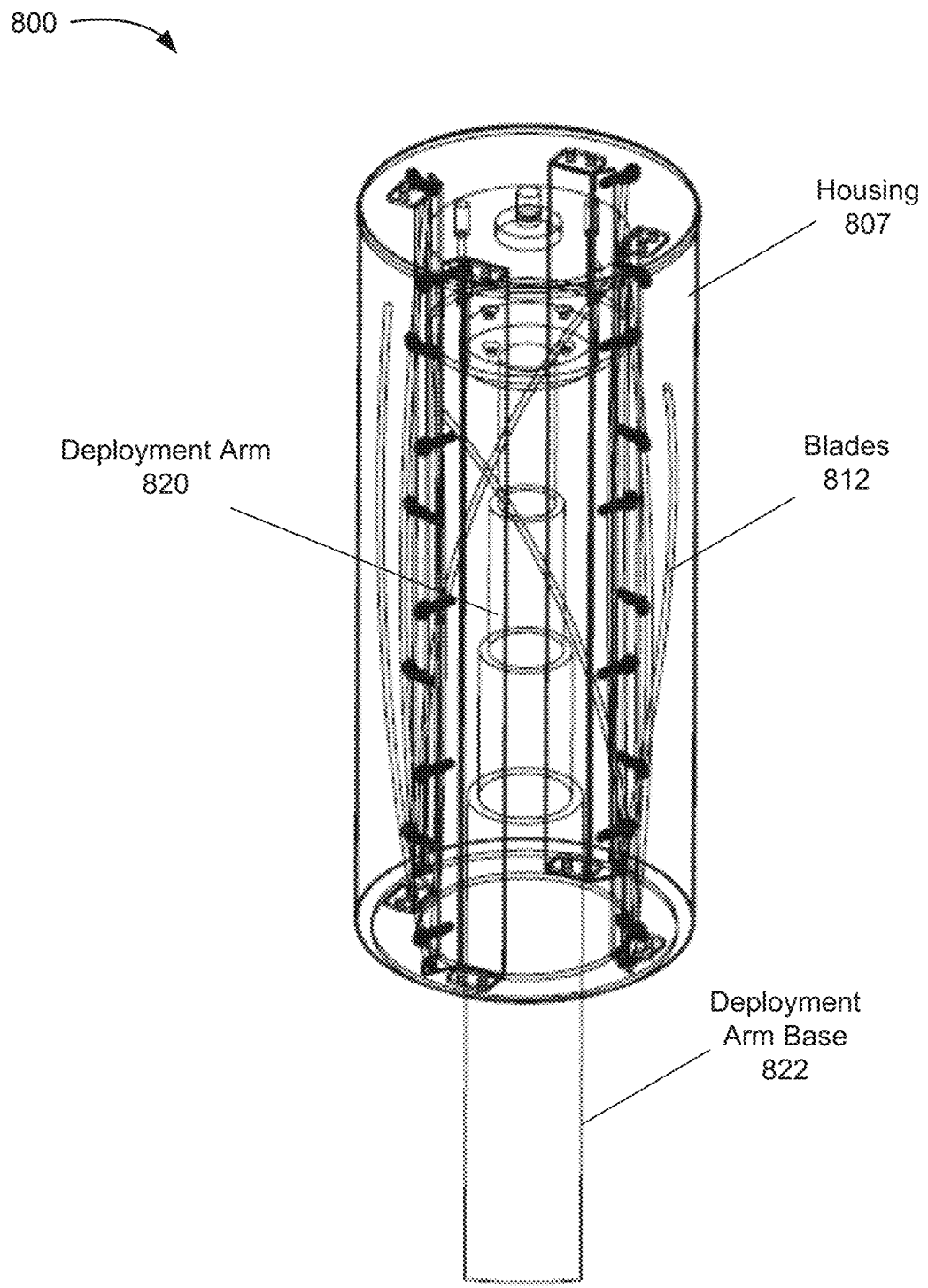
FIG. 8B depicts an example portable and retractable vertical axis wind turbine in a retracted state, in accordance with some embodiments of the present disclosure.

FIG. 8A depicts an example portable and retractable vertical axis wind turbine apparatus 800 in a deployed state, in accordance with some embodiments of the present disclosure. The vertical axis wind turbine apparatus 800 may provide different advantages as compared to a horizontal wind turbine apparatus as described above. For example, as can be seen in FIG. 8B, the vertical wind turbine may be able to be completely and fully retracted within a housing 807 for additional protection and portability of the wind turbine apparatus 800. As depicted, the vertical wind turbine apparatus 800 may include a deployment arm 820, which may be the same or similar to deployment arm 120 and 420 described above. A turbine frame 805 may be coupled to the deployment arm 820. In some embodiments, the deployment arm 820 may extend up through the turbine frame 805 and attached to an upper portion of the turbine frame 805. For example, the deployment arm 820 may be coupled to a generator 809 of the turbine frame 805.

In some embodiments, one or more blades 812 may be coupled to the turbine frame 805 via one or more blade couplings 812. The one or more blades 812 may each include a blade canvas 816 which may include a light flexible material to capture wind and spin the turbine frame 805 thus spinning a rotor within the generator 809 to produce an electrical current. In some embodiments, the blade canvas 816 may each be attached to a blade arm 810 which both extends the blades 812 into a deployed state to capture wind and retracts the blades 812 about the turbine frame 805 when withdrawn into a retracted state, as depicted in FIG. 8B.

FIG. 8B depicts an example portable and retractable vertical axis wind turbine apparatus 800 in a retracted state, in accordance with some embodiments of the present disclosure. In some embodiments, the turbine apparatus 800 may transition between the deployed state of FIG. 8A and the retracted state 8B or from the retracted state to the deployed state. In the retracted state of FIG. 8B, the blades 812 align along the turbine frame 805 and the deployment arm 820 internal to the housing 807. In some embodiments, the blades 812 partially wrap around the turbine frame 805 (e.g., in a spiral manner) such that the blade canvas 816 lays substantially flat around the turbine frame 805 to allow the turbine frame 805 and the blades 812 to withdraw completely into the housing 807. In some embodiments, when in the retracted state, the top of the turbine frame 805 may come into contact with the housing 807 to completely enclose the generator 809 and the blades 812 of the turbine within the housing 807. In some embodiments, the apparatus 800 includes a deployment arm base 822 which may attach to a stand, vehicle, or other structure for stable deployment of the wind turbine.

Figure 8C:
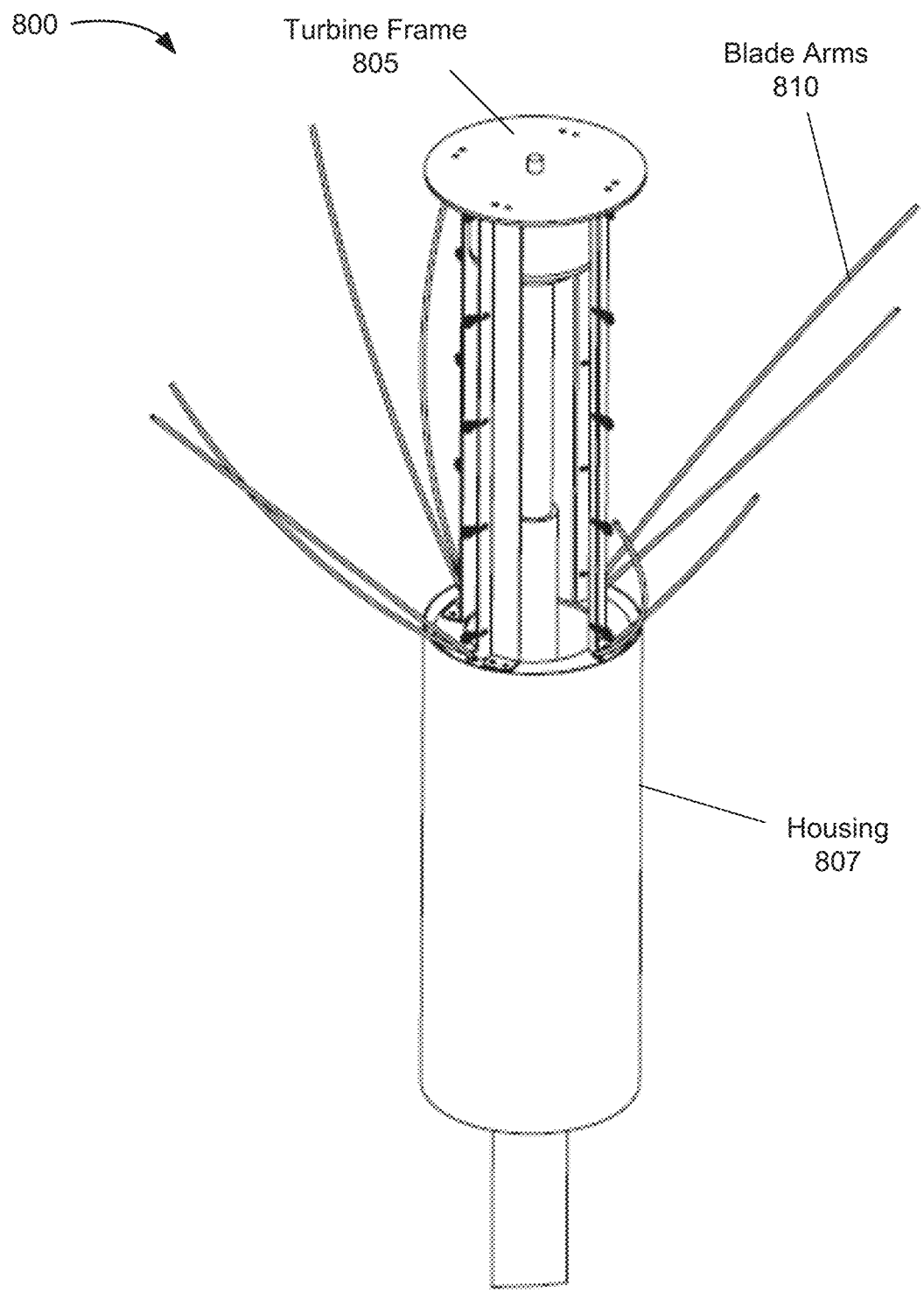
FIG. 8C depicts an example portable and retractable vertical axis wind turbine with articulable turbine places, in accordance with some embodiments of the present disclosure.

FIG. 8C depicts an example portable and retractable vertical axis wind turbine apparatus 800 with articulable turbine places, in accordance with some embodiments of the present disclosure. In particular, FIG. 8C illustrates the skeleton of the vertical axis wind turbine without the blade canvas 816. As can be seen, the turbine frame 805 may be deployed from within the housing 807 by extending the deployment arm 820 at which point the blade arms 810 are allowed to extend outward to open the attached blade canvas 816 for catching wind and converting the wind into rotational kinetic energy for electricity generation.

Figure 9A:
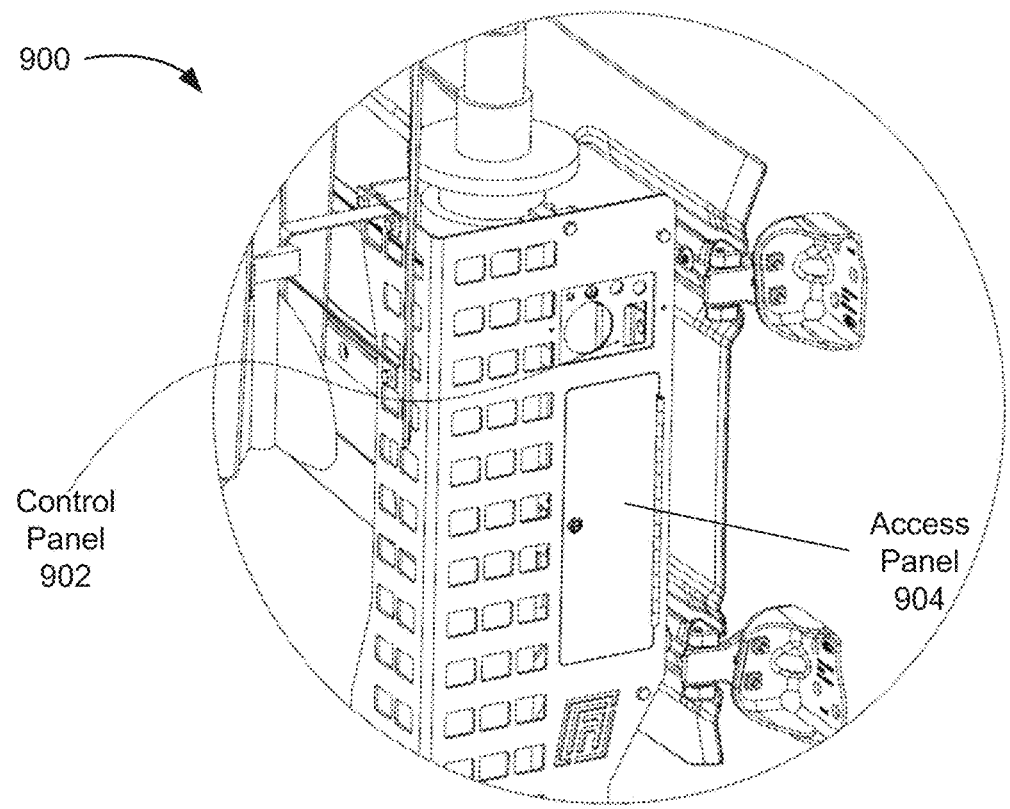
FIG. 9A depicts an example housing and control panel of a portable and retractable wind turbine apparatus, in accordance with some embodiments of the present disclosure.
Figure 9B:
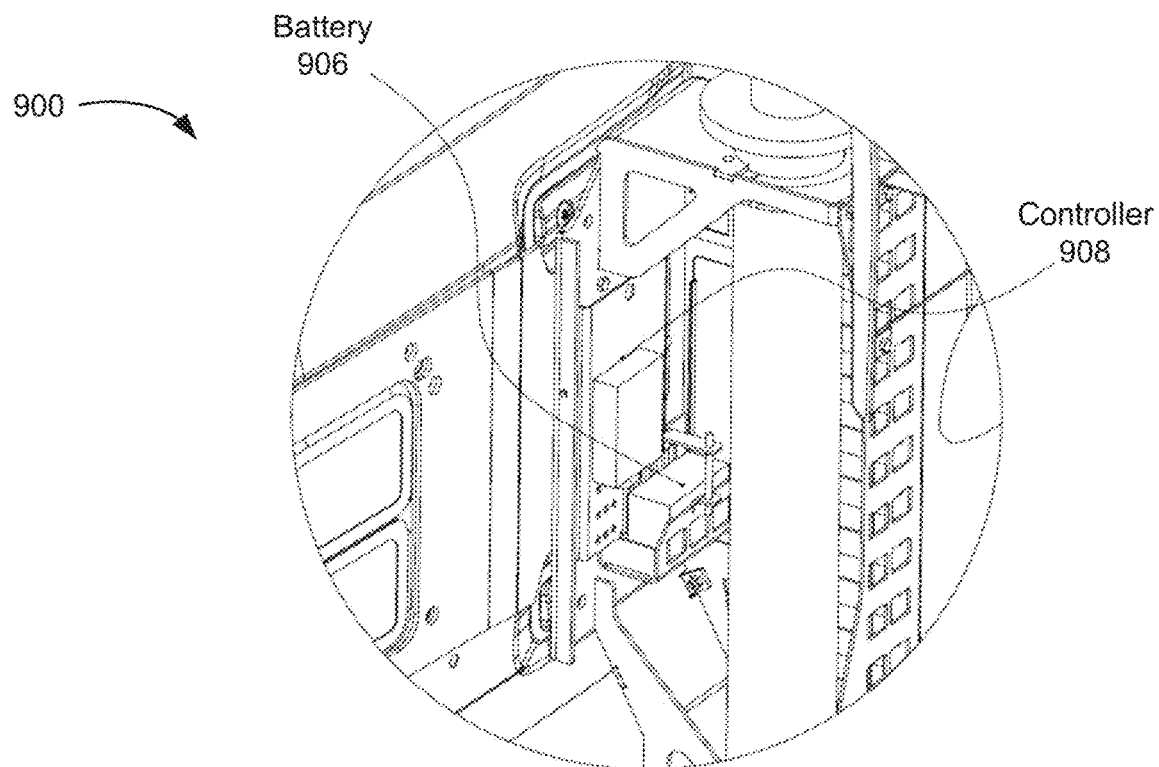
FIG. 9B depicts an example housing, battery, and battery mount of a portable and retractable wind turbine apparatus, in accordance with some embodiments of the present disclosure.

FIGS. 9A and 9B illustrate an example battery and control panel housing 900 for a portable, deployable, and retractable wind turbine apparatus. In some embodiments, the housing 900 may include a control panel 902 for operation of the wind turbine apparatus. For example, the control panel 902 may include one or more switches, levers, buttons, etc. for various operations that can be performed on the wind turbine apparatus. In some embodiments, the control panel 902 may include an input for deploying the wind turbine apparatus and an input for retracting the wind turbine apparatus. For example, the control panel 902 may include a lever for a pneumatic system for extending a deployment arm of the wind turbine apparatus. In some examples, the control panel may further include inputs for managing or switching a battery 906 between a charging mode and a discharge mode. The control panel 902 may also include controls for coupling the apparatus (e.g., a controller 908) to an external computing device to allow for remote control and monitoring of the turbine apparatus. In some embodiments, the control panel 902 may further include a display to indicate a status of the turbine apparatus. In some embodiments, the housing 900 may include an access panel 904 to allow access to the internal components of the housing 900 such as the battery 906, the controller 908, the deployment arm, etc. As depicted, the housing 900 may be coupled to a vehicle. Alternatively, the housing 900 may be mounted to a stand or other structure for deployment.

Figure 10:
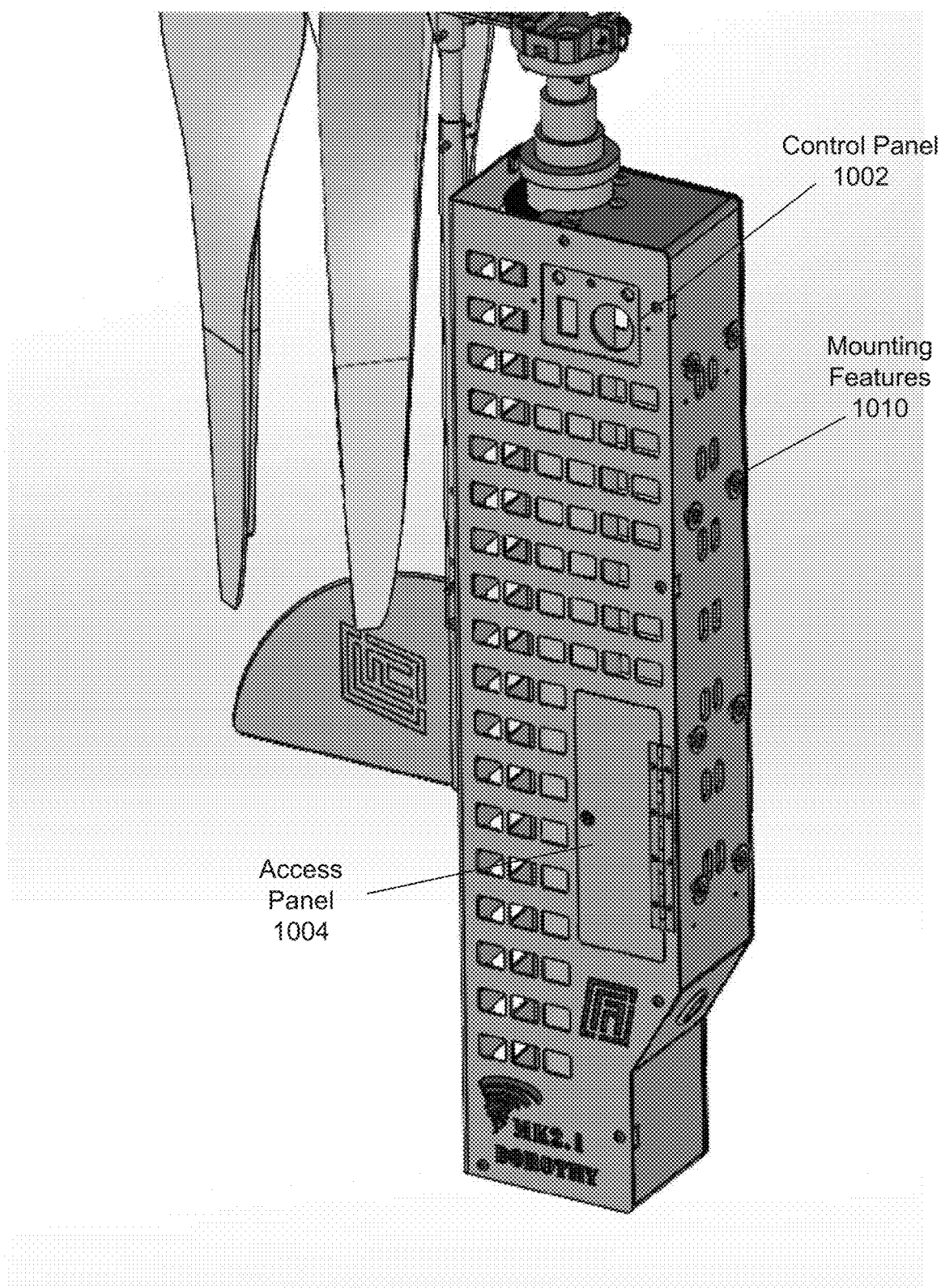
FIG. 10 depicts another example housing for a portable and retractable wind turbine apparatus, in accordance with some embodiments of the present disclosure.

FIG. 10 illustrates another example embodiment of a housing 1000 for a portable, deployable, and retractable wind turbine apparatus. Similar to FIGS. 9A and 9B, the housing 1000 includes a control panel 1002 and an access panel 1004, each of which may operate similar to control panel 902 and access panel 904 of FIG. 9A. In addition, housing 1000 may include mounting features 1010 which may provide for ease of attachment and detachment of the housing 1000 to a vehicle or other structure, further enhancing the portability of the wind turbine apparatus. In some examples, each of the mounting features 1010 may slide into and sit in a corresponding slot of a mounting panel. Thus, the turbine apparatus may be easily attached anywhere that the mounting panel can be attached.

Figure 11:
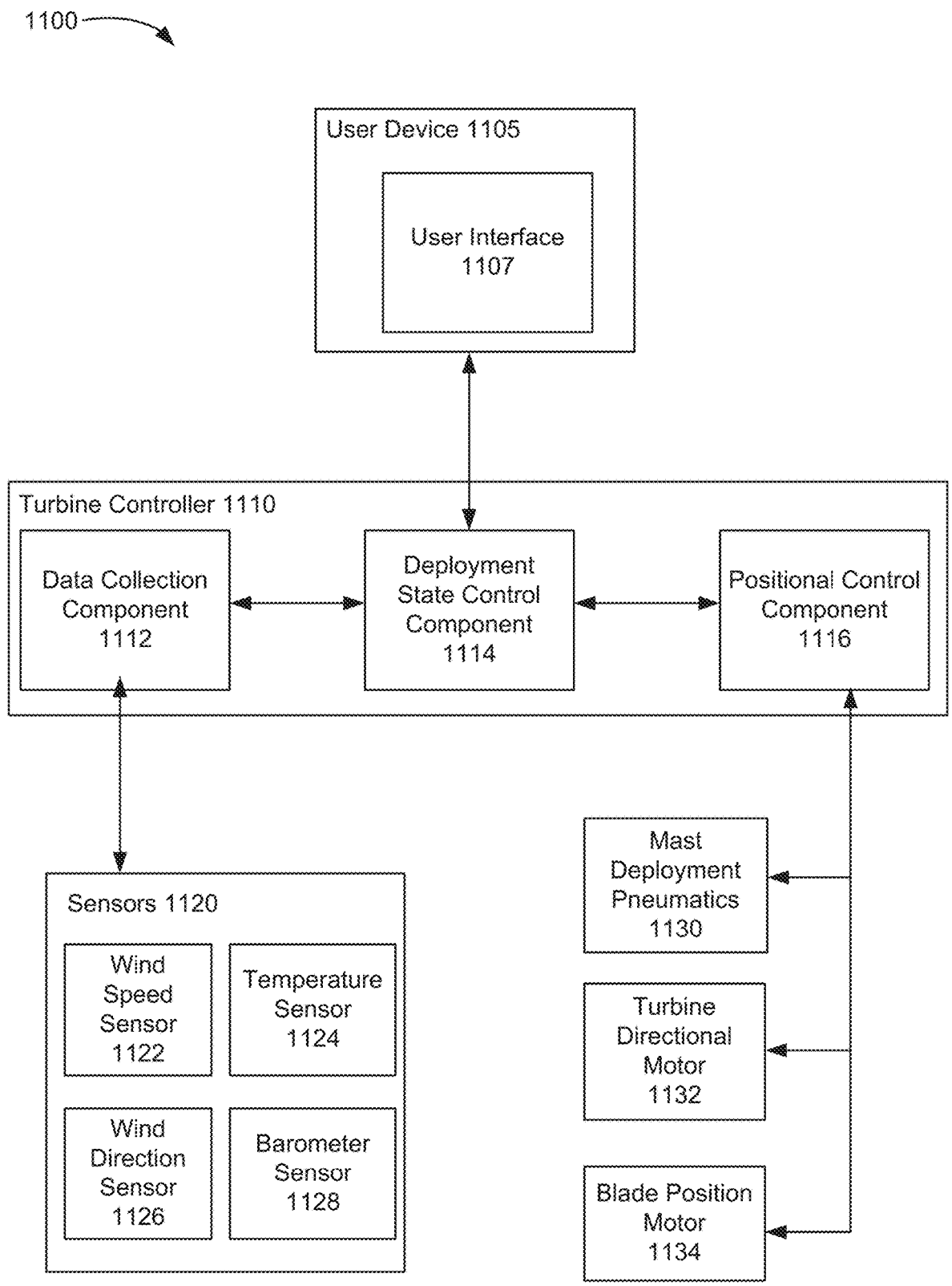
FIG. 11 depicts example system for control and operation of a portable and retractable wind turbine apparatus, in accordance with some embodiments of the present disclosure.

FIG. 11 illustrates an example system 1100 for control and operation of a portable and retractable wind turbine apparatus, in accordance with some embodiments of the present disclosure. System 1100 includes a user device 1105, a turbine controller 1110, and one or more sensors 1120. The user device 1105 may include . . . User device 1105 may include a user interface 1107 to receive inputs from a user for control of a wind turbine apparatus. The user interface 1107 may also display information associated with the wind turbine apparatus, such as information from the sensors 1120, information about a state of the wind turbine apparatus, or any other information of the apparatus. The user device 1105 may be in communication with the turbine controller 1110 (e.g., via a direct local connection, via a network such as the internet or local network, via Bluetooth or other peer to peer communication protocol, or any other communication link). The user device 1105 may provide the inputs provided via the user interface 1107 to the turbine controller 1110. For example, the inputs may include an instruction to either deploy or retract the wind turbine.

Figures 15A, 15B:
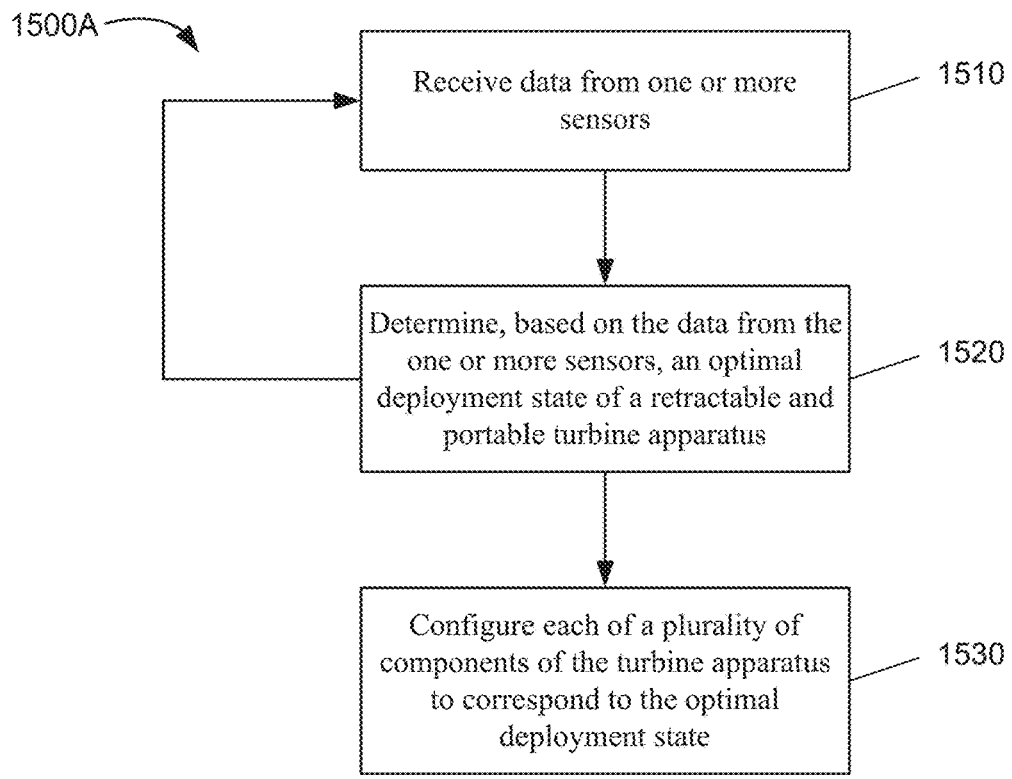
FIG. 15A depicts a flow diagram illustrating another example method of operating a portable and retractable off-grid turbine generator in an optimal deployment state, in accordance with some embodiments of the present disclosure.
FIG. 15B depicts a table of example optimal deployment states of a portable and retractable off-grid turbine generator, in accordance with some embodiments of the present disclosure.

In some embodiments, the turbine controller 1110 includes a data collection component 1112, a deployment state control component 1114, and a positional control component 1116. The data collection component 1112 may receive data from the sensors 1120. In some examples, the sensors 1120 may be sensors of a weathervane to detect weather and atmospheric conditions that may affect the deployment of the wind turbine. For example, the sensors 1120 may include a wind speed sensor 1122, a temperature sensor 1124, a wind direction sensor 1126, and a barometer sensor 1128. It should be noted that any other type of sensor may be included in sensors 1120 for collection of additional data. The data collection component 1112 may receive the data from each of the sensors 1120 and provide the data to the deployment state control component 1114. In some embodiments, the deployment state control component 1114 may determine an optimal state for the wind turbine based on the collected data from the data collection component 1112 and the inputs received from the user device 1105. For example, if the inputs or instructions from the user device 1105 indicate that the turbine should be in the retracted state then the deployment state control component 1114 may establish the retracted state as the current state of the wind turbine. If the instructions indicate to deploy the wind turbine, then the deployment state control component 1114 may apply one or more heuristics to the data collected from the sensors 1120 to determine the optimal state for the wind turbine. Example heuristics indicating conditions and corresponding optimal state are depicted in FIG. 15B. In some embodiments, a machine learning model may be trained to determine an optimal state for the wind turbine based on data collected from the sensor. Alternatively, manual instructions received from the user device 1105 may override any other determined state. Thus, the user may manually control the state in which to operate the wind turbine.

Once the operating state of the wind turbine is determined, the deployment state control component 1114 may provide the determined state to the positional control component 1116. The positional control component 1116 may be coupled with physical control mechanisms such as mast deployment pneumatics 1130, turbine directional motor 1132, and a blade position motor 1134. In some embodiments, the positional control component 1116 may determine control signals to provide to each of the control mechanisms based on the determined operating state and a current state of position of each of the mechanisms. Accordingly, the positional control component 1116 may provide control signals to the mast deployment pneumatics 1130 to extend or withdraw the mast (e.g., extendable deployment arm) to the appropriate position, to the turbine directional motor 1132 to rotate the wind turbine in an optimal direction, and to the blade position motor 1134 to optimally position the blades (e.g., to change blade pitch) or to deploy or retract the blades.

Figure 12:
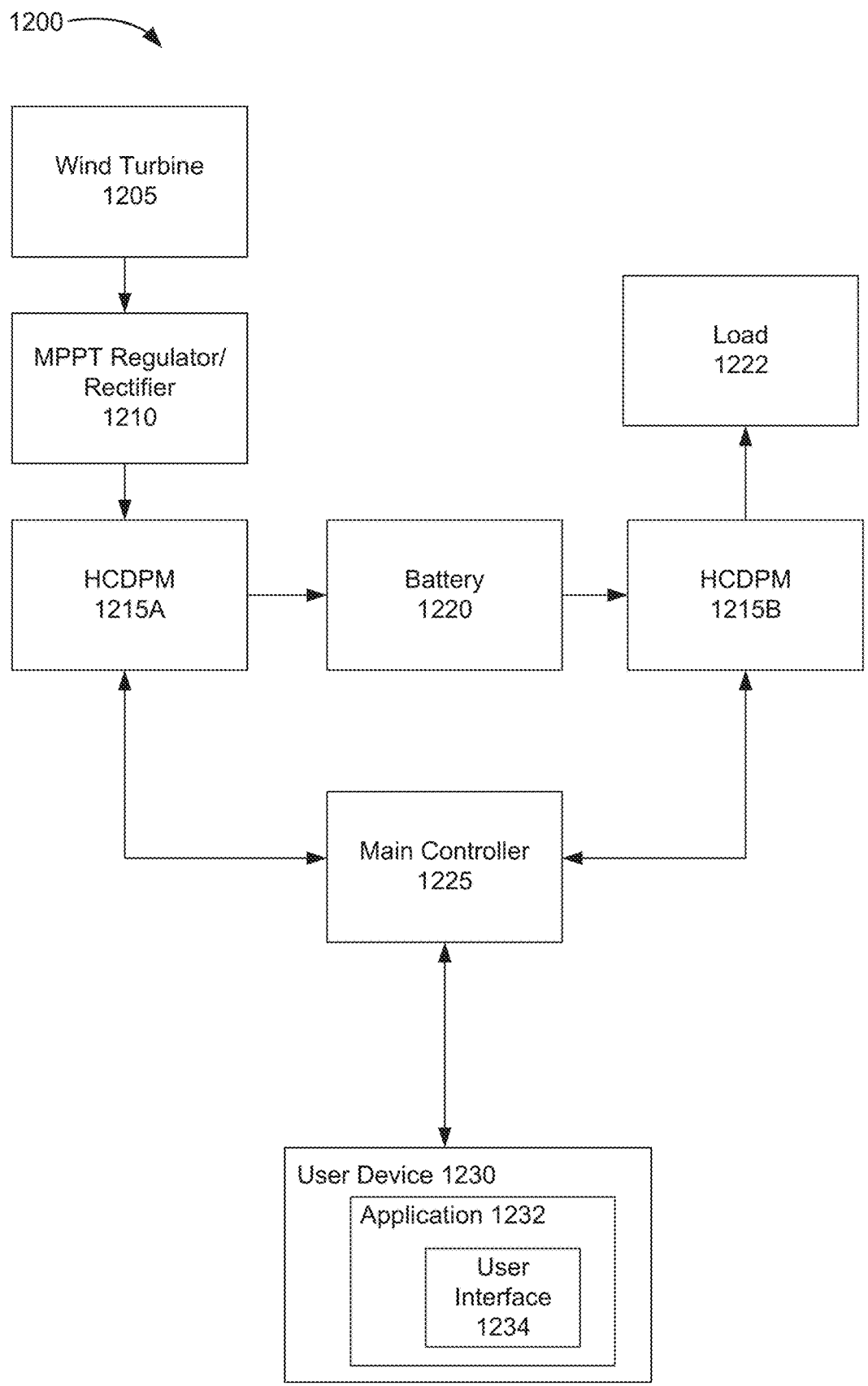
FIG. 12 depicts a block diagram illustrating an example circuit control system for battery charging and discharge with a portable and retractable off-grid turbine generator.

FIG. 12 illustrates a block diagram for an example wind turbine control system 1200, according to some embodiments. System 1200 includes a main controller 1225 coupled to two HCDPMs 1215A-B, where HCDPM 1215A is coupled between a wind turbine 1205 and a battery 1220 and HCDPM 1215B is coupled between a load 1222 and the battery 1220. In some embodiments, an electrical output of the wind turbine 1205 may be coupled to a regulator or rectifier 1210, which may then be coupled to the HCDPM 1215A.

In some examples, system 1200 also includes a user device 1230 in communication with the main controller 1225. User device 1230 may be a server, a mainframe, a workstation, a personal computer (PC), a mobile phone, a palm-sized computing device, or any other computing device. User device 1230 may be in communication with main controller 1225 directly or via a network (e.g., a public network (e.g., the internet), a private network (e.g., a local area network (LAN) or wide area network (WAN)), or a combination thereof). The user device 1230 may execute an application 1232 which may present a user interface 1234 for controlling the wind turbine 1205. In some embodiments, a user may provide control instructions, such as whether to place the system 1200 in a charging state, a discharge state, or both charging and discharging state. The user device 1230 may provide the instructions to the main controller 1225 to manage the circuity of the system 1200 to place the system 1200 in the corresponding operational state. For example, to implement the charging state, the main controller 1225 may provide a signal to HCDPM 1215A to close the circuit between the wind turbine 1205 and the battery and provide a signal to HCDPM 1215B to open the circuit between the battery 1220 and the load 1222. To implement the discharge state, the main controller 1225 may provide a signal to the HCDPM 1215B to close the circuit between the battery 1220 and the load 1222 and a signal to the HCDPM 1215A to open the circuit between the wind turbine 1205 and the battery 1220. Finally, to implement discharge and charging, the main controller 1225 may provide a signal to both HCDPMs 1215A and 1215B to close each circuit.

Figure 13:
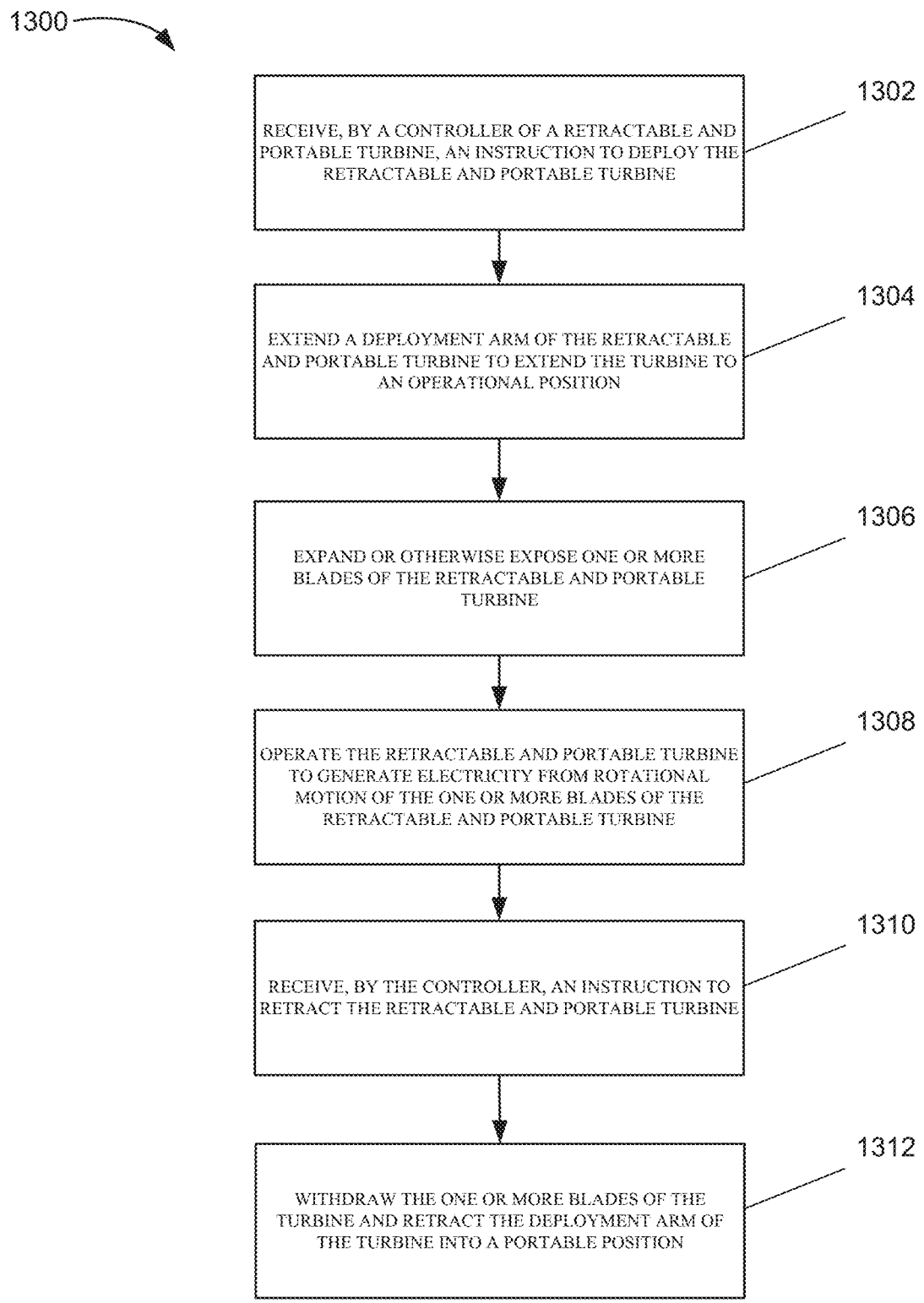
FIG. 13 depicts a flow diagram illustrating an example method of controlling and operating a portable and retractable off-grid turbine generator, in accordance with some embodiments of the present disclosure.

FIG. 13 depicts a flow diagram illustrating an example method for controlling deployment and retraction of a wind turbine apparatus, according to some embodiments. The method 1300 may be performed manually or by a controller. For example, method 1300 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 400 may be performed by a controller such as turbine controller 1110 of FIG. 11 or main controller 1225 of FIG. 12.

With reference to FIG. 13, method 1300 illustrates example functions used by various embodiments. Although specific function blocks ("blocks") are disclosed in method 1300, such blocks are examples. That is, embodiments are well suited to performing various other blocks or variations of the blocks recited in method 1300. It is appreciated that the blocks in method 1300 may be performed in an order different than presented, and that not all of the blocks in method 1300 may be performed.

Method 1300 begins at block 1302, where instructions are received (e.g., by a controller of a retractable and portable turbine apparatus, to deploy the retractable and portable turbine. In some embodiments, the instructions may be an electronic signal to the controller. In some embodiments, the instructions are a manual input, such as via a control panel of the turbine apparatus. In some embodiments, the instructions are automatically generated and provided in response to satisfactory conditions for deployment of the turbine.

At block 1304, a deployment arm of the retractable and portable turbine is extended to extend to the turbine to an operational position. The deployment arm may be extended via a pneumatic system (e.g., air pneumatics), hydraulics, manual crank, motor, or other method for extending the extendable (e.g., telescoping) deployment arm.

At block 1306, one or more blades of the retractable and portable turbine are expanded or otherwise exposed, in the operational position. In some embodiments, the one or more blades may be manually articulated and secured, either individually or all together via a combined mechanism, in a deployed operational position. In some embodiments, the one or more blades may be automatically deployed to the operational position. For example, a motor or multiple motors may apply a torque to the blades to move the blades into the operational position.

At block 1308, the turbine is operated to generate an electric current from rotational motion provided by the one or more blades of the turbine. The electric current may be provided to charge a battery. The battery may be self-contained within the turbine apparatus (e.g., in a chassis of the turbine apparatus) or may be an external battery to which leads of the turbine apparatus are connected.

At block 1310, an instruction to retract the turbine is received (e.g., by the controller). In some embodiments, the instructions may be an electronic signal to the controller. In some embodiments, the instructions are a manual input, such as via a control panel of the turbine apparatus. In some embodiments, the instructions are automatically generated and provided in response to hazardous conditions for the turbine. At block 1312, the one or more blades of the turbine are withdrawn, and the deployment arm of the turbine is retracted into a retracted and portable position.

Figure 14:
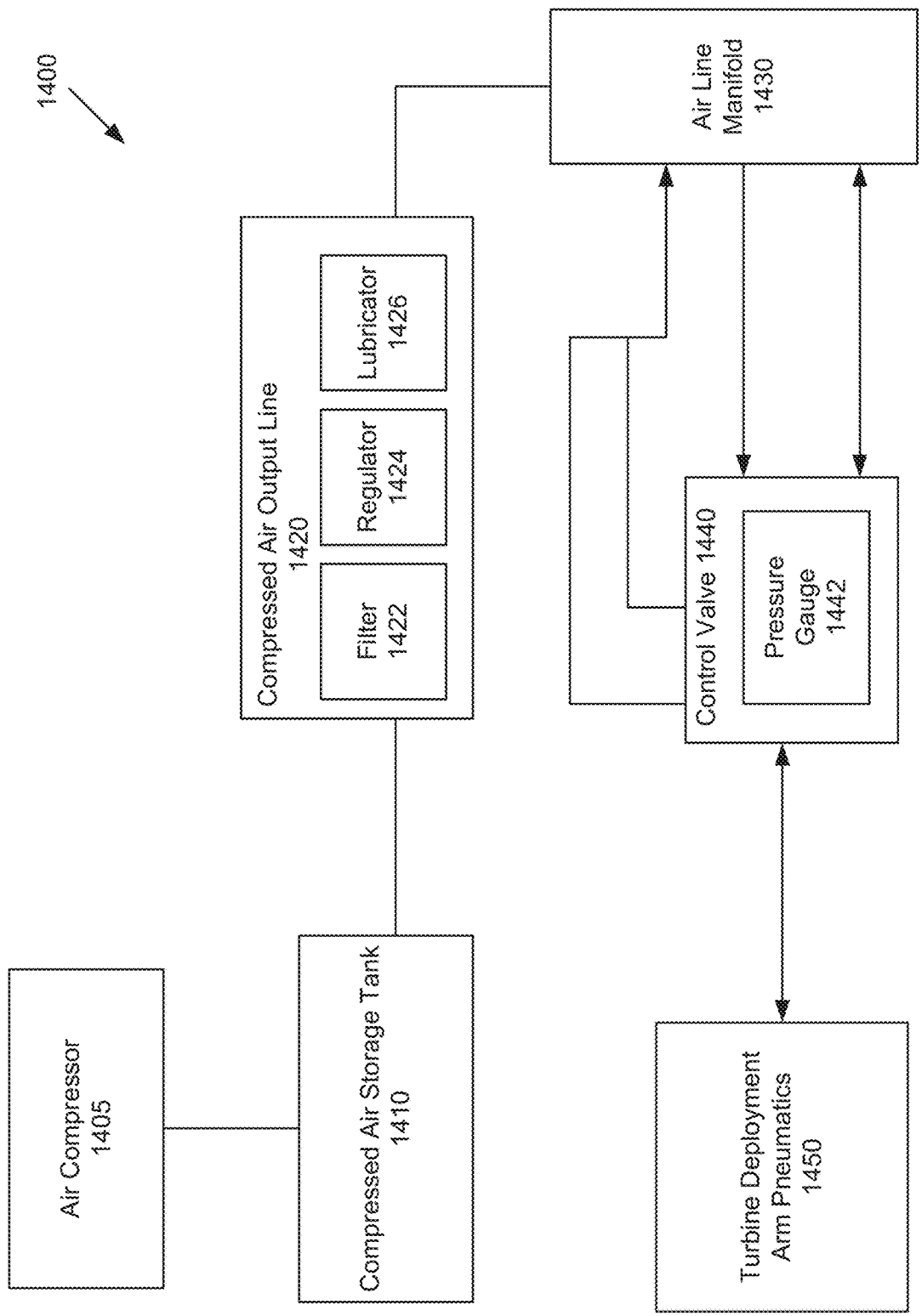
FIG. 14 depicts a block diagram illustrating a pneumatics system for controlling deployment and retraction of a wind turbine apparatus, in accordance with some embodiments of the present disclosure.

FIG. 14 depicts a block diagram illustrating a pneumatics system 1400 for controlling deployment and retraction of a wind turbine apparatus, in accordance with some embodiments of the present disclosure. Pneumatics systems 1400 includes an air compressor 1405 coupled with a compressed air storage tank 1410. The air compressor 1405 may fill compressed air storage tank 1410 with compressed air such that the pressure in the compressed air storage tank 1410 is sufficient to operate turbine deployment arm pneumatics 1450 to deploy and extend the deployment arm described above. The output of the compressed air storage tank 1410 may be coupled to a compressed air output line 1420. The compressed air output line 1420 may include several components to regulate and manage compression and pneumatics of the system 1400. For example, compressed air output line 1420 may include a filter 1422 to filter the compressed air traveling through the compressed air output line 1420, a regulator 1424 to provide constant pressure, and a lubricator 1426 to inject an aerosolized stream of oil into the air line 1420 to provide lubrication to the internal working parts of the turbine extension arm pneumatics 1450 and to any other devices such as actuating cylinders, valves, and motors deployed in system 1400. The compressed air output line 1420 may be coupled to an inlet of an air line manifold 1430. The air line manifold 1430 may be coupled to a control valve 1440. In some embodiments, the manifold 1430 may be coupled to multiple inlets or outlets of the control valve 1440. The control valve 1440 may control the inflation and deflation of the turbine deployment arm pneumatics 1450 for deployment and retraction of the deployment arm. Additionally, the control valve 1440 may allow the compressed air to be diverted to other uses, such as to fill a tire with air or any other uses for compressed air.

FIG. 15A depicts a flow diagram illustrating another example method 1500A of operating a portable and retractable off-grid turbine generator in an optimal deployment state, in accordance with some embodiments of the present disclosure. Method 1500A may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 1500A may be performed by a controller such as turbine controller 1110 of FIG. 11 or main controller 1225 of FIG. 12.

With reference to FIG. 15A, method 1300 illustrates example functions used by various embodiments. Although specific function blocks ("blocks") are disclosed in method 1500A, such blocks are examples. That is, embodiments are well suited to performing various other blocks or variations of the blocks recited in method 1500A. It is appreciated that the blocks in method 1500A may be performed in an order different than presented, and that not all of the blocks in method 1500A may be performed.

Method 1500A begins at block 1510, where processing logic receives data from one or more sensors. For example, the processing logic may receive data from sensors of a weathervane such as wind speed, wind direction, temperature, barometer readings, etc. The processing logic may also receive positional data for each component of a turbine apparatus, such as the position of the position and direction of the wind turbine, the position of a deployment arm of a turbine apparatus, etc.

At block 1520, an optimal deployment state of a retractable and portable turbine apparatus is determined based on data from the one or more sensors. In some embodiments, the optimal deployment state may be determined based on application of one or more heuristics to the data received from the receiver.

At block 1530, each of a plurality of components of the turbine apparatus are configured to correspond to the optical deployment state. For example, the pneumatics and motors of the turbine apparatus may operate to move the turbine apparatus to the determined optimal deployment state.

FIG. 15B depicts a table 1500B of example optimal deployment states of a portable and retractable off-grid turbine generator, in accordance with some embodiments of the present disclosure. FIG. 15B provides several examples of conditions and corresponding deployment states for those conditions. For example, during extreme high wind speed conditions detected by the sensors, the deployment state may be fully retracted to protect the wind turbine apparatus. Medium to high wind speeds may correspond to a partially deployed mast and blade adjustment to catch less wind and reduce unwanted torque on the blades. Low to medium wind speeds may correspond to the fully deployed mast and fully deployed blades to catch a maximum amount of wind. Additionally, the wind turbine may be rotated based on the wind direction (e.g., directed into the wind). Where the vehicle is in motion the wind turbine may be withdrawn into the fully retracted state.

Figure 16:
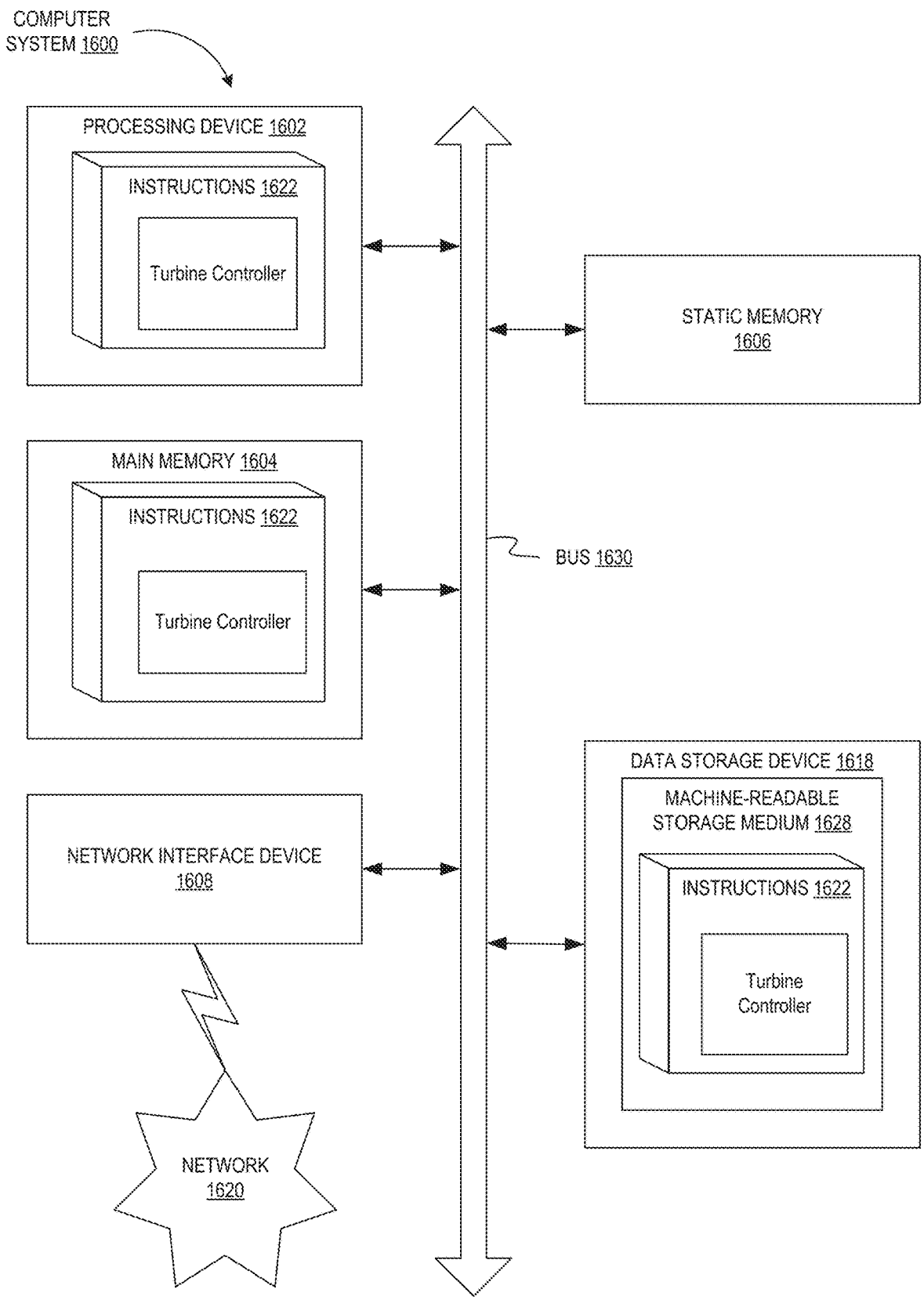
FIG. 16 is a block diagram illustrating an example computer system, in accordance with one implementation of the present disclosure.

FIG. 16 illustrates a diagrammatic representation of a machine in the example form of a computer system 1600 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 1600 may be representative of a server.

The exemplary computer system 1600 includes a processing device 1602, a main memory 1604 (e.g., read-only memory (ROM), flash memory, dynamic random-access memory (DRAM), a static memory 1606 (e.g., flash memory, static random-access memory (SRAM), etc.), and a data storage device 1618, which communicate with each other via a bus 1630. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 1602 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1602 may also be one or more special-purpose processing devices such as an application specific integrated circuit (ASIC), a field programmable gate array (FPGA), a digital signal processor (DSP), network processor, or the like. The processing device 1602 is configured to execute instructions 1622.

The data storage device 1618 may include a machine-readable storage medium 1628, on which is stored one or more set of instructions 1622 (e.g., software) embodying any one or more of the methodologies of operations described herein, including instructions to cause the processing device 1602 to execute the methods described herein. The instructions 1622 may also reside, completely or at least partially, within the main memory 1604 or within the processing device 1602 during execution thereof by the computer system 1600; the main memory 1604 and the processing device 1602 also constituting machine-readable storage media. The instructions 1622 may further be transmitted or received over a network 1620 via the network interface device 1608.

The machine-readable storage medium 1628 may also be used to store instructions to perform a method of controlling a portable and deployable turbine, as described herein. While the machine-readable storage medium 1628 is shown in an exemplary embodiment to be a single medium, the term "machine-readable storage medium" should be taken to include a single medium or multiple media (e.g., a centralized or distributed database, or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular embodiments may vary from these exemplary details and still be contemplated to be within the scope of the present disclosure.

Reference throughout this specification to "one embodiment" or "an embodiment" means that a particular feature, structure, or characteristic described in connection with the embodiments included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or."

Additionally, some embodiments may be practiced in distributed computing environments where the machine-readable medium is stored on and or executed by more than one computer system. In addition, the information transferred between computer systems may either be pulled or pushed across the communication medium connecting the computer systems.

Embodiments of the claimed subject matter include, but are not limited to, various operations described herein.

These operations may be performed by hardware components, software, firmware, or a combination thereof.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent or alternating manner.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

What is claimed is:

1. An apparatus for deployment of a wind turbine, comprising:
   a wind turbine coupled to a first end of an extendable arm;
   one or more turbine blades coupled to the wind turbine, wherein the one or more turbine blades are collapsible about the wind turbine; and
   a housing coupled to a second end of the extendable arm, wherein the wind turbine is linearly extendable from and retractable to the housing via the extendable arm, the extendable arm being fully retractable into the housing, and wherein the wind turbine is configured to articulate to a position that is substantially parallel to the extendable arm and external to the housing.

2. The apparatus of claim 1, wherein the wind turbine is configured to articulate between a deployed position substantially perpendicular to the extendable arm and a retracted position substantially parallel to the extendable arm.

3. The apparatus of claim 2, wherein the one or more turbine blades are configured to collapse about the wind turbine in the retracted position, wherein when collapsed the turbine blades are disposed parallel to a body of the wind turbine.

4. The apparatus of claim 1, wherein the extendable arm is configured to retract to a shortened position when the wind turbine is in a retracted state, the retracted state to minimize a volume occupied by the apparatus.

5. The apparatus of claim 1, wherein the extendable arm is extendable using at least one of a pneumatic pump, a hydraulic pump, a crank system, a pulley system, or a mechanical engine.

6. The apparatus of claim 1, wherein the housing is configured to be attachable to a vehicle.

7. The apparatus of claim 1, further comprising:
   a controller configured to:
      receive an input; and
      transition the wind turbine from a retracted state to a deployed state or from the deployed state to the retracted state based on the input.

8. The apparatus of claim 1, wherein the wind turbine is electrically coupled to a battery disposed within the housing, wherein the wind turbine generates an electric current to charge the battery when in a deployed state.

9. A system comprising:
   a turbine apparatus comprising:
      a wind turbine coupled to a first end of an extendable arm;
      one or more turbine blades coupled to the wind turbine, wherein the one or more turbine blades are collapsible about the wind turbine; and
      a housing coupled to a second end of the extendable arm, wherein the wind turbine is extendable from and retractable to the housing via the extendable arm, the extendable arm being fully retractable into the housing, and wherein the wind turbine is configured to articulate to a position that is substantially parallel to the extendable arm and external to the housing; and
   a controller configured to:
      receive an input; and
      transition the turbine apparatus from a retracted state to a deployed state or from the deployed state to the retracted state based on the input.

10. The system of claim 9, wherein the wind turbine is configured to articulate between a deployed position substantially perpendicular to the extendable arm and a retracted position substantially parallel to the extendable arm.

11. The system of claim 10, wherein the one or more turbine blades are configured to collapse about a body of the wind turbine in the retracted position, wherein when collapsed the turbine blades are disposed parallel to the body of the wind turbine.

12. The system of claim 11, wherein the extendable arm is configured to retract to a shortened position when the turbine is in a retracted state, the retracted state to minimize a volume occupied by the system.

13. The system of claim 9, wherein the extendable arm is extendable using at least one of a pneumatic pump, a hydraulic pump, a crank system, a pulley system, or a mechanical engine.

14. A method of deploying a turbine, comprising:
   providing a turbine apparatus in a retracted state, wherein the turbine apparatus comprises:
      a wind turbine coupled to a first end of an extendable arm,
      one or more turbine blades coupled to the wind turbine, wherein the one or more turbine blades are collapsible about the wind turbine, and a housing coupled to a second end of the extendable arm, wherein the wind turbine is extendable from and retractable to the housing via the extendable arm, the extendable arm being fully retractable into the housing, and wherein the wind turbine is configured to articulate to a position that is substantially parallel to the extendable arm and external to the housing;

converting the turbine apparatus from the retracted state to a deployed state, wherein converting the turbine apparatus comprises:

extending the extendable arm;

articulating the wind turbine from a retracted position to an operating position;

and expanding the one or more turbine blades from a collapsed state to an expanded state; and operating the wind turbine in the deployed state to generate an electric current.

15. The method of claim 14, wherein the operating position of the wind turbine is substantially perpendicular to the extendable arm and the retracted position of the wind turbine is substantially parallel to the extendable arm.

16. The method of claim 14, wherein the housing is attached to a vehicle.

* * * * *